United States Patent
Chen et al.

(10) Patent No.: US 10,897,611 B2
(45) Date of Patent: Jan. 19, 2021

(54) FIXED-FOCUS PHOTOGRAPHING MODULE AND FOCUSING DEVICE AND METHOD THEREOF

(71) Applicant: NINGBO SUNNY OPOTECH CO., LTD., Ningbo (CN)

(72) Inventors: Zhenyu Chen, Ningbo (CN); Mingzhu Wang, Ningbo (CN); Xiaojuan Su, Ningbo (CN); Bojie Zhao, Ningbo (CN)

(73) Assignee: Ningbo Sunny Opotech Co., Ltd.

( * ) Notice: Subject to any disclaimer, the term of this patent is extended or adjusted under 35 U.S.C. 154(b) by 107 days.

(21) Appl. No.: 16/311,896

(22) PCT Filed: Jun. 23, 2017

(86) PCT No.: PCT/CN2017/089751
§ 371 (c)(1),
(2) Date: Jan. 25, 2019

(87) PCT Pub. No.: WO2017/220016
PCT Pub. Date: Dec. 28, 2017

(65) Prior Publication Data
US 2019/0182478 A1 Jun. 13, 2019

(30) Foreign Application Priority Data
Jun. 23, 2016 (CN) .................... 2016 2 0638177 U

(51) Int. Cl.
*H04N 17/00* (2006.01)
*H04N 5/225* (2006.01)
(Continued)

(52) U.S. Cl.
CPC ........... *H04N 17/002* (2013.01); *G02B 7/025* (2013.01); *H04N 5/225* (2013.01); *H04N 5/23212* (2013.01)

(58) Field of Classification Search
CPC .. H04N 17/002; H04N 5/225; H04N 5/23212; G02B 7/025; G02B 7/02;
(Continued)

(56) References Cited

U.S. PATENT DOCUMENTS

2005/0270403 A1   12/2005 Adachi et al.
2005/0274883 A1*  12/2005 Nagano .................. G02B 7/025
                                                250/239
(Continued)

FOREIGN PATENT DOCUMENTS

CN    101477235 A    7/2009
CN    102998765 B    1/2016
(Continued)

OTHER PUBLICATIONS

PCT International Search Report and Written Opinion completed by the ISA/CN dated Aug. 30, 2017 and issued in connection with PCT/CN2017/089751.

*Primary Examiner* — Nhan T Tran
(74) *Attorney, Agent, or Firm* — Barnes & Thornburg LLP

(57) ABSTRACT

Provided are a fixed-focus photographing module, a manufacturing method thereof, and a focusing device and method thereof. The focusing method includes: pre-assembling an optical lens assembly in a lens assembly holder, wherein the optical lens assembly is exposed at the exterior of the lens assembly holder, and the optical lens assembly is located in a photosensing path of a photosensing component assembled in a circuit board to form a pre-assembled photographing module; performing, by the pre-assembled photographing module, a photographing operation to obtain a testing image; adjusting, according to the testing image, a relative position between the optical lens assembly and lens assembly holder until the pre-assemble photographing module outputs a clear image as required; and fixing the optical (Continued)

lens assembly and the lens assembly holder to complete a focusing operation and obtain an assembled fixed-focus photographing module.

19 Claims, 21 Drawing Sheets

(51) Int. Cl.
*G02B 7/02* (2006.01)
*H04N 5/232* (2006.01)

(58) Field of Classification Search
CPC .... G02B 7/28; G03B 2217/002; G03B 17/12; G03B 13/32; G06T 7/80
See application file for complete search history.

(56) References Cited

U.S. PATENT DOCUMENTS

| | | |
|---|---|---|
| 2006/0132644 A1 | 6/2006 | Shangguan et al. |
| 2009/0237629 A1 | 9/2009 | Koo |
| 2011/0311213 A1 | 12/2011 | Lin |
| 2014/0016124 A1 | 1/2014 | Chang et al. |
| 2015/0301303 A1* | 10/2015 | Kim .................. B32B 37/1292 348/373 |
| 2016/0134796 A1* | 5/2016 | Kaneko ................ H04N 5/2252 348/208.11 |
| 2017/0163856 A1* | 6/2017 | Wang .................. H04N 17/002 |
| 2019/0064399 A1 | 2/2019 | Wang et al. |

FOREIGN PATENT DOCUMENTS

| | | | | |
|---|---|---|---|---|
| CN | 105487190 A | | 4/2016 | |
| CN | 105487191 A | | 4/2016 | |
| CN | 105549173 A | | 5/2016 | |
| CN | 205792938 U | | 12/2016 | |
| CN | 205809504 U | | 12/2016 | |
| DE | 10 2009 027 514 | * | 1/2011 | ............. G03B 17/00 |
| JP | 2004179736 A | | 6/2004 | |
| JP | 2006078517 A | | 3/2006 | |
| KR | 20070012185 A | | 1/2007 | |
| KR | 100826270 B1 | | 4/2008 | |

* cited by examiner

FIXED-FOCUS PHOTOGRAPHING MODULE AND FOCUSING DEVICE AND METHOD THEREOF

CROSS-REFERENCE TO RELATED APPLICATIONS

This application is a U.S. national counterpart application of international application Ser. No. PCT/CN2017/089751, filed Jun. 23, 2017, which claims priority to Chinese Patent Application Nos. 201610480992.1, 201620650844.5, 201610487305.9, and 201620638177.9, all filed Jun. 23, 2016. The disclosures of PCT/CN2017/089751, Chinese Patent Application Nos. 201610480992.1, 201620650844.5, 201610487305.9, and 201620638177.9 are incorporated by reference in their entireties.

TECHNICAL FIELD

The present disclosure relates to the field of optical imaging, in particular to a fixed-focus photographing module and a manufacturing method and a focusing method thereof.

BACKGROUND

With the rapid development of science and technology by leaps and bounds and the continuous improvement of people's economic status, portable electronic devices such as smart phones and tablet computers and related technologies have developed rapidly. Photographing modules for helping users to shoot images have become one of the standard configurations of the portable electronic devices. Typically, the portable electronic device is configured with a front photographing module, in order to facilitate the user to take a selfie or make a video call through the portable electronic device. Since there is no need to reserve space for focusing once a fixed-focus photographing module is configured in the portable electronic device, in order to control the size of a portable electronic device, the fixed-focus photographing module becomes the first choice for the front photographing module of the portable electronic device.

In recent years, portable electronic devices have become more and more intelligent, light and thin. This development trend of the portable electronic devices requires, on the one hand, to add smart components to make the portable electronic devices have more powerful functions, on the one hand, to reduce the sizes of the various components of a portable electronic device to control the size of the portable electronic device. This development trend of the portable electronic devices places demanding requirements on, in particular, the size of the fixed-focus photographing module. Although there is no need to reserve space for focusing after the fixed-focus photographing module is configured in the portable electronic device, the fixed-focus photographing module still needs to be focused in the process of packaging to ensure the imaging quality of the fixed-focus photographing module.

FIG. 1 is a prior art fixed-focus photographing module including a photosensing component 10P, an optical lens assembly 20P, and a base 3P, where the base 3P includes a base body 33P and a lens barrel 34P. The lens barrel 34P integrally extends to the base body 33P, where the photosensing component 10P is disposed on the base body 33P, and the optical lens assembly 20P is disposed on the lens barrel 34P, to make the optical lens assembly 20P locate in the photosensing path of the photosensing component 10P.

In the fixed-focus photographing module of prior art, the optical lens assembly 20P is fixed and held in a focused position by the lens barrel 34P. The arrangement of the lens barrel 34P limits the size of the fixed-focus photographing module, and even becomes a technical bottleneck restricting the development of the fixed-focus photographing module. In addition, since the optical lens assembly 20P is mounted inside the lens barrel 34P, in the process of mounting the optical lens assembly 20P and the lens barrel 34P or adjusting the position of the optical lens assembly 20P relative to the lens barrel 34P to focus the fixed-focus photographing module, some contaminants such as particles are generated on the outer surface of the optical lens assembly 20P and the inner surface of the lens barrel 34P due to mutual friction of the outer surface of the optical lens assembly 20P and the inner surface of the lens barrel 34P, and these contaminants may be retained at the interior of the fixed-focus photographing module. Even after the fixed-focus photographing module is packaged, it is impossible to take out these contaminants such as particles. As time goes by and external shocks experienced by the fixed-focus photographing module, some contaminants such as particles may enter the optical path of the optical lens assembly 20P and may be imaged on the photosensing component 10P, thereby causing the occurrence of stained points, lowering the imaging quality of the fixed-focus photographing module.

SUMMARY

An objective of the present disclosure is to provide a fixed-focus photographing module, a manufacturing method thereof, a focusing apparatus and a focusing method, where the size of the fixed-focus photographing module can be effectively reduced, so that the fixed-focus photographing module is particularly suitable for being applied to the electronic devices that seek to be light and thin.

An objective of the present disclosure is to provide a fixed-focus photographing module, a manufacturing method thereof, a focusing apparatus and a focusing method, where the optical lens assembly of the fixed-focus photographing module is directly packaged in the lens assembly holder, so that the fixed-focus photographing module does not need to provide a lens barrel to fix the optical lens assembly and the lens assembly holder, that is, there is no need to provide a lens barrel around the optical lens assembly, so that the head size of the fixed-focus photographing module can be reduced.

An objective of the present disclosure is to provide a fixed-focus photographing module, a manufacturing method thereof, a focusing apparatus and a focusing method, where the optical lens assembly is directly packaged in the lens assembly holder and exposed at an exterior of the lens assembly holder to effectively reduce the height dimension of the photographing module.

An objective of the present disclosure is to provide a fixed-focus photographing module, a manufacturing method thereof, a focusing apparatus and a focusing method, where the focusing apparatus includes a focusing mechanism, and the focusing mechanism can adjust the position of the optical lens assembly relative to a photosensing component of the fixed-focus photographing module by engaging with the outer peripheral surface of the optical lens assembly, to ensure the imaging quality of the Fixed-focus photographing module.

An objective of the present disclosure is to provide a fixed-focus photographing module, a manufacturing method thereof, a focusing apparatus and a focusing method, where a glue layer is formed between the optical lens assembly and the lens assembly holder for packaging the optical lens assembly in the lens assembly holder.

An objective of the present disclosure is to provide a fixed-focus photographing module, a manufacturing method thereof, a focusing apparatus and a focusing method, where the glue layer is used to seal the joint between the optical lens assembly and the lens assembly holder to prevent solid particle contaminants generated on the outer surface of the optical lens assembly from entering the interior from the exterior of the fixed-focus photographing module through the joint between the optical lens assembly and the lens assembly holder, in the process of performing focusing on the fixed-focus photographing module by the focusing apparatus.

An objective of the present disclosure is to provide a fixed-focus photographing module, a manufacturing method thereof, a focusing apparatus and a focusing method, where the glue layer is used to seal a gap between the optical lens assembly and the lens assembly holder to o prevent external contaminants or light from entering the interior from the exterior of the fixed-focus photographing module through the joint between the optical lens assembly and the lens assembly holder.

An objective of the present disclosure is to provide a fixed-focus photographing module, a manufacturing method thereof, a focusing apparatus and a focusing method, where the glue layer is used to improve the flatness of the optical lens assembly and the lens assembly holder such that the central axis of the optical lens assembly and the central axis of the lens assembly holder coincide with each other, to ensure the imaging quality of the fixed-focus photographing module.

An objective of the present disclosure is to provide a fixed-focus photographing module, a manufacturing method thereof, a focusing apparatus and a focusing method, where since the lens barrel of the conventional base is removed, after the fixed-focus photographing module is packaged, the optical lens assembly is in a bare state, which is convenient for cleaning, so that the solid particle contaminants mounted to the outside of the fixed-focus photographing module are removed by washing the fixed-focus photographing module, and the probability of poor staining of the photographing module is reduced.

An objective of the present disclosure is to provide a fixed-focus photographing module, a manufacturing method thereof, a focusing apparatus and a focusing method, where the fixed-focus photographing module does not need to provide a lens barrel. In this way, the product material cost and technical difficulty of the fixed-focus photographing module can be reduced, to improve the product competitiveness of the fixed-focus photographing module.

An objective of the present disclosure is to provide a fixed-focus photographing module, a manufacturing method thereof, a focusing apparatus and a focusing method, where the top end of the lens assembly holder provides an inner groove for accommodating an optical filtering element, thereby reducing the height of the fixed-focus photographing module.

An objective of the present disclosure is to provide a fixed-focus photographing module, a manufacturing method thereof, a focusing apparatus and a focusing method, where the lens assembly holder provides an outer groove for packaging the optical lens assembly by using the glue layer, thereby reducing the height of the fixed-focus photographing module.

An objective of the present disclosure is to provide a fixed-focus photographing module, a manufacturing method thereof, a focusing apparatus and a focusing method, where the focusing apparatus provides a computing device, and the computing device can perform a focusing operation on the fixed-focus photographing module by analyzing an image captured by the fixed-focus photographing module.

An objective of the present disclosure is to provide a fixed-focus photographing module, a manufacturing method thereof, a focusing apparatus and a focusing method, where the computing device can generate a focusing signal after analyzing the image captured by the fixed-focus photographing module, and the focusing signal is executed by the focusing mechanism to change the relative position between the optical lens assembly and the photosensing component, to perform the focusing operation on the fixed-focus photographing module.

An objective of the present disclosure is to provide a fixed-focus photographing module, a manufacturing method thereof, a focusing apparatus and a focusing method, where after the focusing apparatus performs the focusing operation on the fixed-focus photographing module, an adhesive is cured to maintain the optical lens assembly in the focused position, thereby forming the fixed-focus photographing module.

An objective of the present disclosure is to provide a fixed-focus photographing module, a manufacturing method thereof, a focusing apparatus and a focusing method, where the fixed-focus photographing module includes a photosensing assembly and the lens assembly, and the lens assembly is directly mounted on the photosensing assembly instead of being mounted through the lens barrel.

An objective of the present disclosure is to provide a fixed-focus photographing module, a manufacturing method thereof, a focusing apparatus and a focusing method, where the photosensing assembly includes an integrated base and a circuit board, the integrated base is integrally formed on the circuit board, and the lens assembly is directly disposed on the integrated base.

An objective of the present disclosure is to provide a fixed-focus photographing module, a manufacturing method thereof, a focusing apparatus and a focusing method, where the integrated base is integrally formed on the circuit board and at least a portion of the photosensing component.

An objective of the present disclosure is to provide a fixed-focus photographing module, a manufacturing method thereof, a focusing apparatus and a focusing method, where the photosensing assembly includes a support, the support is disposed on the integrated base, and the optical filtering element is mounted on the support.

An objective of the present disclosure is to provide a fixed-focus photographing module, a manufacturing method thereof, a focusing apparatus and a focusing method, where the optical lens assembly includes at least two group units, and at least one of the group units is directly disposed on the lens base.

An objective of the present disclosure is to provide a fixed-focus photographing module, a manufacturing method thereof, a focusing apparatus and a focusing method, where at least one of the group units of the optical group units is directly mounted on the integrated base.

An objective of the present disclosure is to provide a fixed-focus photographing module, a manufacturing method thereof, a focusing apparatus and a focusing method, where the respective group units are exposed to the exterior of the lens base or the integrated base, for being adjusted and operated conveniently.

An objective of the present disclosure is to provide a fixed-focus photographing module, a manufacturing method thereof, a focusing apparatus and a focusing method, where the respective group units are exposed to the exterior of the lens base or the integrated base, so that each of the group units may be adjusted, and the adjustable range is wider, instead of being limited to adjusting the group unit at the top.

An objective of the present disclosure is to provide a fixed-focus photographing module, a manufacturing method thereof, a focusing apparatus and a focusing method, where the fixed-focus photographing module is formed by adjusting a plurality of group units, reducing the lens accumulated error of the lens assembly, and is suitable for manufacturing a fixed-focus photographing module of multi-lens.

An objective of the present disclosure is to provide a fixed-focus photographing module, a manufacturing method thereof, a focusing apparatus and a focusing method, where the focusing mechanism may directly and repeatedly adjust each of the group units, to improve the imaging quality of the fixed-focus photographing module.

According to the present disclosure, a method for focusing a fixed-focus photographing module capable of achieving the foregoing and other objectives and advantages and includes the following steps:

(A) an optical lens assembly is pre-assembled in a lens assembly holder, where the optical lens assembly is exposed at the exterior of the lens assembly holder, and the optical lens assembly is positioned in a photosensing path of a photosensing component assembled in a circuit board, to form a pre-assembled photographing module;

(B) the pre-assembled photographing module performs a photographing operation to obtain a testing image;

(C) the relative position between the optical lens assembly and the lens assembly holder is adjusted based on the testing image, until the pre-assembled photographing module outputting a desired clear image; and (D) the optical lens assembly and the lens assembly holder are fixed to complete the focusing operation and obtain an assembled fixed-focus photographing module.

In some embodiments, glue is dispensed between the optical lens assembly and the lens assembly holder, and after positions of the optical lens assembly and the lens assembly holder are determined, the glue is cured to form a sealed glue layer between the optical lens assembly and the lens assembly holder.

According to another aspect of the present disclosure, the present disclosure provides a focusing apparatus, configured to perform a focusing operation on a pre-assembled photographing module, the pre-assembled photographing module including a circuit board, a photosensing component assembled to the circuit board, a lens assembly holder disposed on the circuit board and an optical lens assembly pre-assembled to the lens assembly holder, the optical lens assembly being exposed at the exterior of the lens assembly holder, and the optical lens assembly being positioned in a photosensing path of the photosensing component, the focusing apparatus including:

a computing device, connected to the pre-assembled photographing module to acquire an image captured by the pre-assembled photographing module; and a focusing mechanism, the focusing mechanism including a lens assembly holding apparatus and a photosensing assembly holding apparatus, the lens assembly holding apparatus holding, at a top side of the lens assembly holder of the pre-assembled photographing module, the optical lens assembly, the photosensing assembly holding apparatus being configured to directly or indirectly hold the lens assembly holder, the computing device adjusting a relative position between the optical lens assembly and the lens assembly holder by analyzing the image captured by the pre-assembled photographing module, to adjust a relative position between the optical lens assembly and a photosensing chip, so that the pre-assembled photographing module outputting a required clear image to complete the focusing operation.

There is no need to provide any components around the optical lens assembly of the fixed-focus photographing module of the present disclosure, so that the size of the fixed-focus photographing module can be reduced by reducing the head size of the fixed-focus photographing module. When the fixed-focus photographing module is applied to an electronic device, the reduction in the size of the fixed-focus photographing module can leave more space for other components of the electronic device, thereby enabling the electronic device to meet the trend of intelligent, light and thin.

The focusing apparatus of the present disclosure is configured to perform a focusing operation on the fixed-focus photographing module in the process of packaging the fixed-focus photographing module, to ensure the imaging quality of the fixed-focus photographing module. In the process of packaging the fixed-focus photographing module, first the optical lens assembly and the photosensing component packaged in the lens assembly holder are held at an approximate position, to capture an image through the fixed-focus photographing module, for example, the fixed-focus photographing module may capture an image of a test form. Second, the computing device generates a focusing signal by analyzing the image, and the focusing mechanism changes, based on the focusing signal and through the lens assembly holding apparatus and the photosensing assembly holding apparatus, the relative position between the optical lens assembly and the photosensing component, to complete the focusing operation on the fixed-focus photographing module. It is worth mentioning that the focusing signal includes deviation angles and displacements of the optical lens assembly and the photosensing component, for example, the focusing signal includes the flatness of the optical lens assembly and the photosensing component, an amplitude of the distance which should be adjusted, and the like.

The focusing mechanism can fix the optical lens assembly from the outer peripheral side surface of the optical lens assembly, remove the original mating structure between the base and the lens, i.e., the lens barrel, and ensure that the optical lens assembly images accurately and corresponds to the photosensing component, and finally the photographing module outputs a clear image. In addition, the focusing mechanism fixes the optical lens assembly from the outer peripheral side surface of the optical lens assembly, which is beneficial to reducing the technical difficulty and cost of performing the focusing operation on the fixed-focus photographing module. Further, the glue layer disposed or formed between the optical lens assembly and the lens assembly holder is used to seal the gap between the optical lens assembly and the lens assembly holder, to prevent solid particle contaminants from entering the interior from the exterior of the fixed-focus photographing module through the joint between the optical lens assembly and the lens assembly holder, thereby facilitating improvement of the imaging quality of the fixed-focus photographing module.

DETAILED DESCRIPTION OF EMBODIMENTS

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

Figure 1:
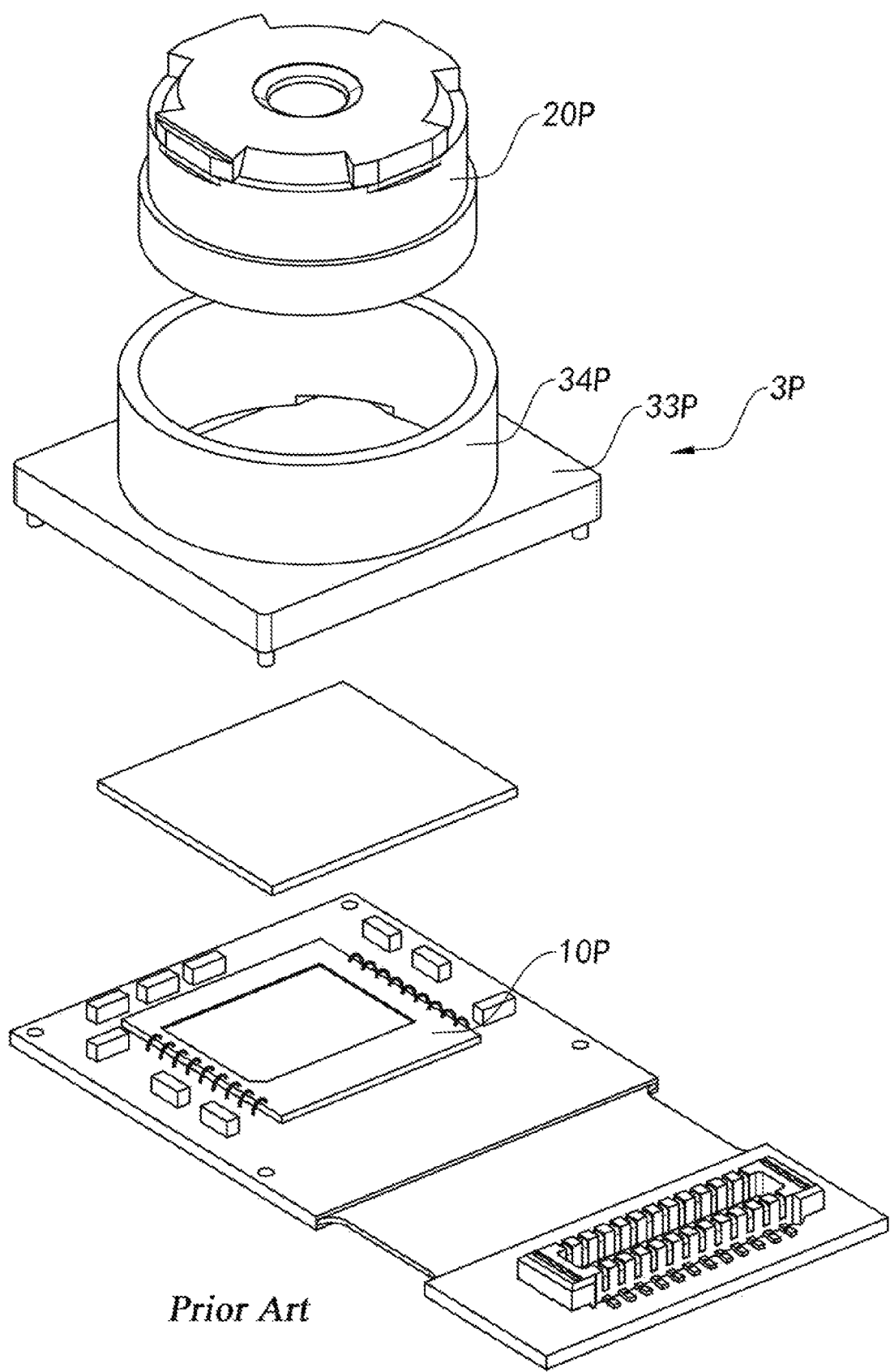
FIG. 1 is an exploded schematic diagram of the prior art.
Figure 2:
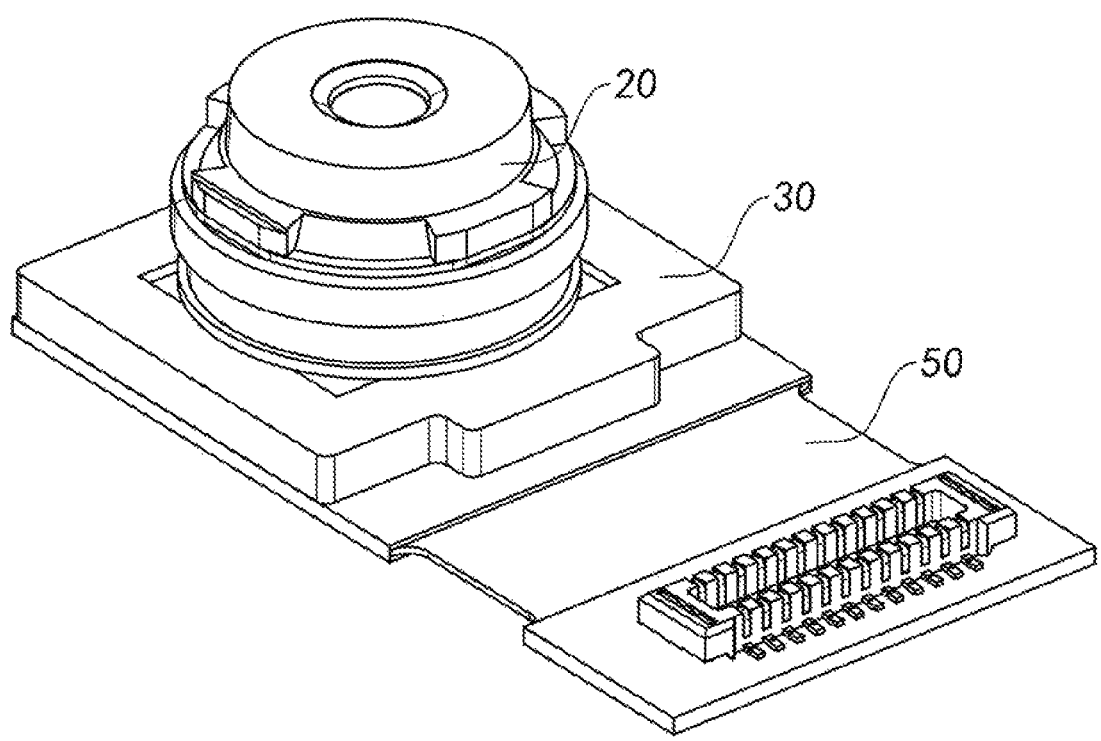
FIG. 2 is a three-dimensional schematic diagram of a fixed-focus photographing module according to a preferred embodiment of the present disclosure.
Figure 3:
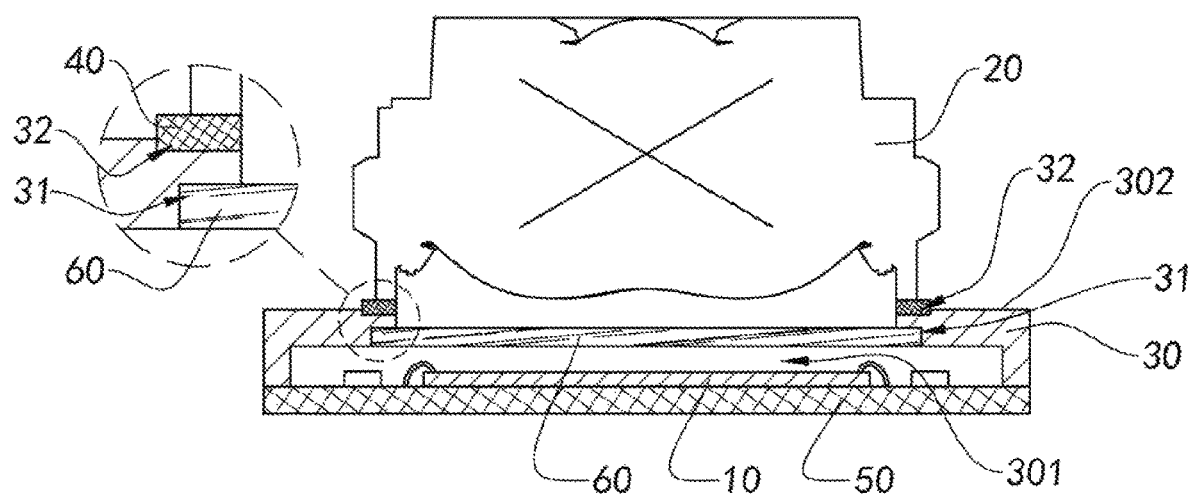
FIG. 3 is a cross-sectional schematic diagram of the fixed-focus photographing module according to the above preferred embodiment of the present disclosure.

Referring to FIG. 2 and FIG. 3 of the accompanying drawings of the present disclosure, a fixed-focus photographing module according to a preferred embodiment of the present disclosure is illustrated. Here, the fixed-focus photographing module includes a photosensing component 10 and an optical lens assembly 20 and a lens assembly holder 30, and an aperture 301 is formed in the center of the lens assembly holder 30. Here, the optical lens assembly 20 is directly packaged at the top end 302 of the lens assembly holder 30, and the optical lens assembly 20 is held in the photosensing path of the photosensing component 10. Light reflected by an object can enter the interior of the fixed-focus photographing module from the optical lens assembly 20 and be received and photoelectrically converted by the photosensing component 10, to generate an image (e.g., image or video) associated with the object.

It is worth mentioning that in the fixed-focus photographing module of the present disclosure, the type of the photosensing component 10 and the type of the optical lens assembly 20 are not limited. For example, in an exemplary description, the photosensing component 10 may be a Charge Coupled Device (CCD), or the photosensing component 10 may be a Complementary Metal-Oxide Semiconductor (CMOS). Alternatively, the photosensing component 10 may be a silicon photonics chip. That is, in the fixed-focus photographing module of the present disclosure, the photosensing component 10 refers to any optical element capable of realizing photoelectric conversion after receiving light reflected by an object. Correspondingly, the optical lens assembly 20 refers to any optical element capable of allowing the light reflected by an object to enter the interior from the exterior of the fixed-focus photographing module and improving the quality of the light.

In the fixed-focus photographing module of the present disclosure, the optical lens assembly 20 is directly packaged in the lens assembly holder 30. That is to say, the fixed-focus photographing module of the present disclosure does not need to provide the lens barrel structure in the prior art, and in this way, the volume of the fixed-focus photographing module around the optical lens assembly 20 can be reduced, so that when the fixed-focus photographing module is mounted on an electronic device, the fixed-focus photographing module can occupy the space of the electronic device as little as possible, thereby enabling the electronic device to leave more space for the installation of other components. In a specific example, a space of at least 0.2 mm can be saved in any direction around the optical lens assembly 20, that is, the head of the fixed-focus photographing module (i.e., the optical lens assembly 20 and the surrounding area) can save a space of at least 0.4 mm, which is of great significance for the fixed-focus photographing module to be applied to electronic devices that are intelligent, light and thin.

In addition, the fixed-focus photographing module of the present disclosure does not need to provide the lens barrel structure in the prior art, but directly packages the optical lens assembly 20 at the top end 302 of the lens assembly holder 30, and the optical lens assembly 20 protrudes outward from the lens assembly holder 30. In this way, the material used can be reduced to reduce the cost of the fixed-focus photographing module, thereby improving the product competitiveness of the fixed-focus photographing module. That is, the optical lens assembly 20 is substantially exposed at the exterior of the lens assembly holder 30, thereby reducing the size of the lens end of the photographing module.

In the process of packaging the fixed-focus photographing module of the present disclosure, by means of that a focusing mechanism holds, at the exterior of the optical lens assembly 20, the optical lens assembly 20, the position of the optical lens assembly 20 relative to the photosensing component 10 is adjusted to improve the imaging quality of the fixed-focus photographing module. Therefore, in this process, even if the focusing mechanism causes the optical lens assembly 20 to generate contaminants such as solid particles, the contaminants such as solid particles can not enter the interior of the fixed-focus photographing module, which prevents stains caused by the contaminants such as solid particles, thereby ensuring the imaging quality of the fixed-focus photographing module. After the contaminants such as solid particles are generated, the contaminants such as solid particles may adhere to the outer surface of the fixed-focus photographing module at most, and after the fixed-focus photographing module is packaged, the contaminants such as solid particles that adhere to the outer surface of the fixed-focus photographing module can be removed by cleaning, which ensures the imaging quality of the fixed-focus photographing module during use when configured in the electronic device.

Further, as shown in FIG. 3, the fixed-focus photographing module includes a glue layer 40, where the glue layer 40 is located between the optical lens assembly 20 and the lens assembly holder 30 for directly packaging the optical lens assembly 20 at the top end 302 of the lens assembly holder 30. It is worth mentioning that the glue layer 40 can not only connect the optical lens assembly 20 and the lens assembly holder 30, but also be used to hermetically connect the optical lens assembly 20 and the lens assembly holder 30, to prevent contaminants such as solid particles or external contaminants or external light from entering the interior of the fixed-focus photographing module from the outside of the fixed-focus photographing module through the joint between the optical lens assembly 20 and the lens assembly holder 30, thus ensuring the imaging quality of the fixed-focus photographing module.

In an embodiment of the fixed-focus photographing module, the glue layer 40 may be separately formed to be subsequently disposed between the optical lens assembly 20 and the lens assembly holder 30. Preferably, the glue layer 40 may be in semi-solidified state so that the glue layer 40 has viscosity and the thickness at any position of the glue layer 40 can be adjusted, and after the glue layer 40 is disposed between the optical lens assembly 20 and the lens assembly holder 30 and the focusing of the fixed-focus photographing module is completed, the glue layer 40 can be cured, so that the glue layer 40 ensures that the optical lens assembly 20 is held in position after being focused.

In another embodiment of the fixed-focus photographing module, the glue layer 40 is formed between the optical lens assembly 20 and the lens assembly holder 30. Specifically, the dispensing is selectively performed at a corresponding position of at least one of the optical lens assembly 20 and the lens assembly holder 30. After the dispensing operation is completed, the lower end surface of the optical lens assembly 20 is mounted on the lens assembly holder 30 for disposing the glue between the optical lens assembly 20 and the lens assembly holder 30, and focusing the fixed-focus photographing module. When focusing, the optical lens assembly 20 may be hold from the exterior of the optical lens assembly 20. After the focusing is completed, the glue is cured to form the glue layer 40 between the optical lens assembly 20 and the lens assembly holder 30. Preferably, dispensing may be performed only at the corresponding position of the lens assembly holder 30, to prevent the glue from contaminating the optical lens assembly 20. More preferably, the glue may be cured by irradiation of ultraviolet light (Ultraviolet Rays).

It is worth mentioning that after the dispensing operation is completed at the corresponding position of the lens assembly holder 30, the glue may be semi-cured to prevent the glue from contaminating the optical lens assembly 20 in the process of packaging the optical lens assembly 20 in the lens assembly holder 30. In other words, after the glue is applied to the lens assembly holder 30 by dispensing, the glue may be semi-cured to make the semi-cured glue have viscosity and plasticity. After the lower end surface of the optical lens assembly 20 is mounted on the lens assembly holder 30 and the focusing of the fixed-focus photographing module is completed, the glue is cured to form the glue layer 40 between the optical lens assembly 20 and the lens assembly holder 30. On the one hand, the glue layer 40 keeps the optical lens assembly 20 in a position after being focused, and on the other hand, the glue layer 40 seals the joint between the optical lens assembly 20 and the lens assembly holder 30. Of course, it is also possible to completely cure the glue after the dispensing operation and determining the positions of the optical lens assembly 20 and the lens assembly holder 30, that is, it is not necessary to perform the focusing operation in the semi-cured state.

In the process of packaging the fixed-focus photographing module of the present disclosure, the glue layer 40 can improve the alignment of the optical lens assembly 20 and the lens assembly holder 30, so that the central axis of the optical lens assembly 20 can coincide with the central axis of the photosensing component 10 to improve the imaging quality of the fixed-focus photographing module. That is, the glue layer 40 can compensate for the product error of the optical lens assembly 20, the product error of the lens assembly holder 30 and the mounting errors of the optical lens assembly 20 and the lens assembly holder 30, thereby improving the imaging quality of the fixed-focus photographing module.

Referring to FIG. 2 and FIG. 3, the fixed-focus photographing module further includes a circuit board 50, where the photosensing component 10 is mounted to the circuit board 50, and the lens assembly holder 30 is disposed on the circuit board 50. The optical lens assembly 20 and the photosensing component 10 are positioned to correspond to each other. Preferably, the circuit board 50 may be a PCB circuit board (Printed Circuit Board), and after the photosensing component 10 is mounted to the circuit board 50, the circuit board 50 can maintain the flatness of the photosensing component 10. Nevertheless, those skilled in the art may understand that the circuit board 50 may also be any structure capable of connecting the photosensing component 10 and the other elements of the electronic device, for example, the circuit board 50 may be an FPC circuit board (Flexible Printed Circuit). Specifically, the circuit board 50 implemented as an FPC circuit board may be mounted to a reinforcing member (for example, a metal reinforcing member), and then the photosensing component 10 is mounted to the reinforcing member, and the photosensing component 10 is connected to the circuit board 50, thus the flatness of the photosensing component 10 is ensured by the reinforcing member.

In the fixed-focus photographing module of the present disclosure, the photosensing component 10 may be first fixed to the circuit board 50, and then the photosensing component 10 is connected to the circuit board 50 through a wire bonding process, so that the photosensing component 10 is mounted to the circuit board 50. It may be understood that connecting the photosensing component 10 and the circuit board 50 by way of wire bonding is only an exemplary description. In other examples, the photosensing component 10 may provide one or more chip pads. The circuit board 50 may provide one or more circuit board pads. The mountment between the photosensing component 10 and the circuit board 50 can also be achieved by soldering the chip pad of the photosensing component 10 and the circuit board pad of the circuit board 50. The photosensing component 10 may be assembled into the circuit board 50 by a COB (Chip on Board) method or an FC (Flip Chip) flip method.

In addition, the fixed-focus photographing module further includes an optical filtering element 60, where the optical filtering element 60 is disposed between the photosensing component 10 and the optical lens assembly 20, for improving the imaging quality of the fixed-focus photographing module. Light reflected by an object enters the interior of the fixed-focus photographing module from the optical lens assembly 20, and is further received and photoelectrically converted by the photosensing component 10 after being filtered by the optical filtering element 60, to generate an image associated with the object. That is, the optical filtering element 60 can filter the stray light in the light reflected by the object from the optical lens assembly 20 into the interior of the fixed-focus photographing module to improve the imaging quality of the fixed-focus photographing module.

It is worth mentioning that the type of the optical filtering element 60 is not limited. For example, in one example of the present disclosure, the optical filtering element 60 may be an infrared cut-off filter to filter infrared light in the light reflected by the object entering the interior of the fixed-focus photographing module. In another example of the present disclosure, the optical filtering element 60 may also be a visible light cut-off filter. In addition, the optical filtering element 60 may also be adjusted, for example, the optical filtering element 60 may be movably disposed on the lens assembly holder 30, to make the fixed-focus photographing module be applied to different service environments by changing the position of the optical filtering element 60.

Referring to FIG. 3, the optical filtering element 60 is packaged inside the lens assembly holder 30 such that the optical filtering element 60 is held between the optical lens assembly 20 and the photosensing component 10. For example, first the optical filtering element 60 may be packaged inside the lens assembly holder 30, and then the circuit board 50 may be packaged in the lens assembly holder 30.

Referring to FIG. 3, the interior of the top end 302 of the lens assembly holder 30 is provided with an inner groove 31, where the optical filtering element 60 is packaged in the inner groove 31 of the lens assembly holder 30. In this way, the height of the fixed-focus photographing module can be effectively reduced, so that the fixed-focus photographing module is particularly suitable for being applied to the electronic devices that seek to be light and thin. In addition, an outer groove 32 is disposed on the exterior of the lens assembly holder 30. In one example, the optical lens assembly 20 is directly packaged in the outer groove 32 of the lens assembly holder 30 through the glue layer 40. In another example, only the glue layer 40 may be positioned in the outer groove 32 of the lens assembly holder 30. In this way, the height of the fixed-focus photographing module can be further effectively reduced, so that the fixed-focus photographing module is particularly suitable for being applied to the electronic devices that seek to be light and thin. When the glue layer 40 is formed in the outer groove 32, the limit of the glue layer 40 is also facilitated. It may be understood that, in another embodiment, the inner groove 31 and the outer groove 32 may be omitted, that is, flat surfaces, respectively, for mounting the optical filtering element 60 and setting the glue layer 40.

Figure 4:
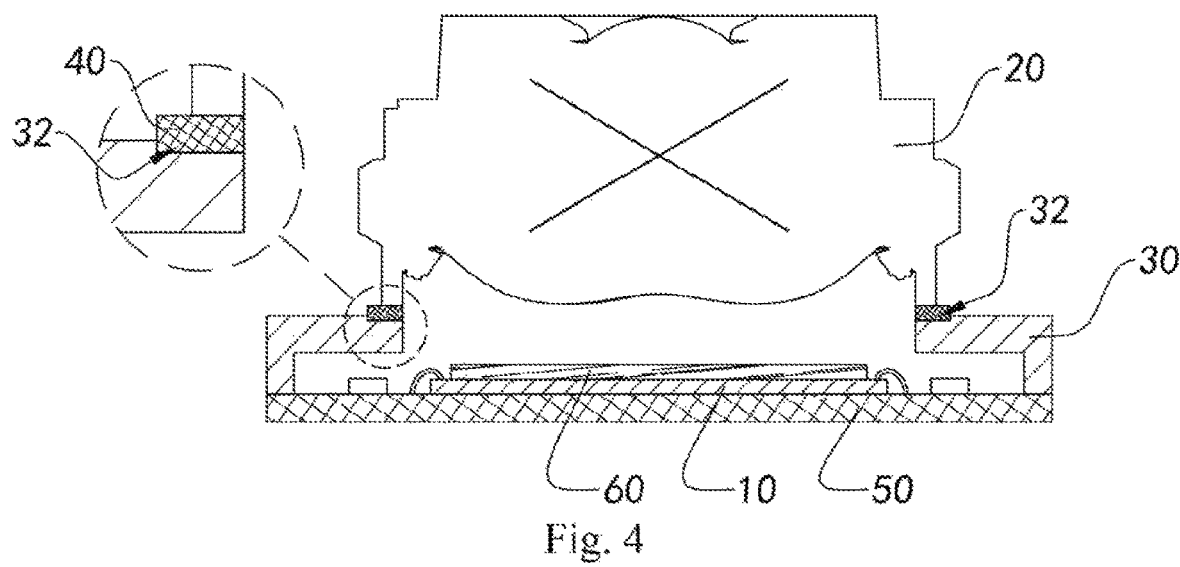
FIG. 4 is a cross-sectional schematic diagram of a modified embodiment of the fixed-focus photographing module according to the above preferred embodiment of the present disclosure.

FIG. 4 is a modified embodiment of the fixed-focus photographing module, where the fixed-focus photographing module of this embodiment of the present disclosure differs from the structure of the fixed-focus photographing module of the above preferred embodiment in the position at which the optical filtering element 60 is packaged. Specifically, in the fixed-focus photographing module of this embodiment of the present disclosure, the optical filtering element 60 is disposed on the circuit board 50, and the optical filtering element 60 overlays on the photosensing component 10. Preferably, the optical filtering element 60 and the photosensing component 10 are directly mounted together. When the circuit board 50 is packaged in the lens assembly holder 30, the optical filtering element 60 is held between the optical lens assembly 20 and the photosensing component 10. In another modified embodiment, the lens assembly holder 30 may integrally clad around the optical filtering element 60, the photosensing component 10 and the circuit board 50, thereby forming an integrated unitary structure.

Figure 5A:
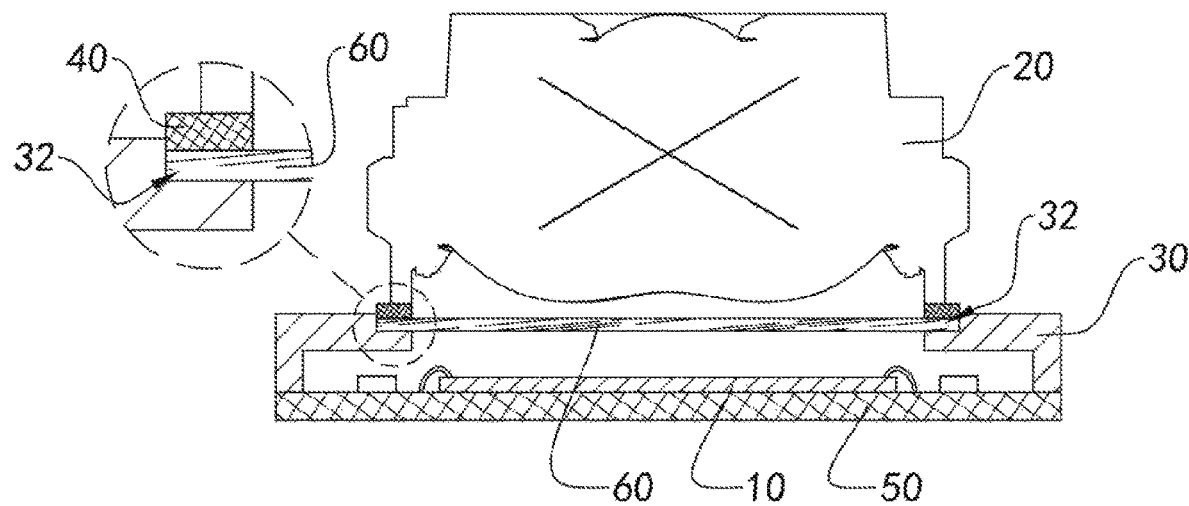
FIG. 5A is a cross-sectional schematic diagram of another modified embodiment of the fixed-focus photographing module according to the above preferred embodiment of the present disclosure.

FIG. 5A is another modified embodiment of the fixed-focus photographing module, where the fixed-focus photographing module of this embodiment of the present disclosure differs from the structure of the fixed-focus photographing module of the above preferred embodiment in the position at which the optical filtering element 60 is packaged. Specifically, in the fixed-focus photographing module of this embodiment of the present disclosure, the optical filtering element 60 is packaged in the outer groove 32 of the lens assembly holder 30 to make the optical filtering element 60 more adjacent to the optical lens assembly 20, and the optical filtering element 60 packaged at the top end 302 of the lens assembly holder 30 can be held between the optical lens assembly 20 and the photosensing component 10. That is, the outer groove may be used to mount the optical filtering element 60 and provide installation space for the glue layer 40.

It is worth mentioning that in some embodiments, a portion of the optical lens assembly 20 may be mounted to the optical filtering element 60 and a portion may be mounted to the lens assembly holder 30. That is, after the optical filtering element 60 is mounted, glue may be applied at the bottom end of the optical lens assembly 20 or the top ends of the optical filtering element 60 and the lens assembly holder 30, and the glue layer 40 is then formed between the optical lens assembly 20, the lens assembly holder 30, and the optical filtering element 60.

Figure 5B:
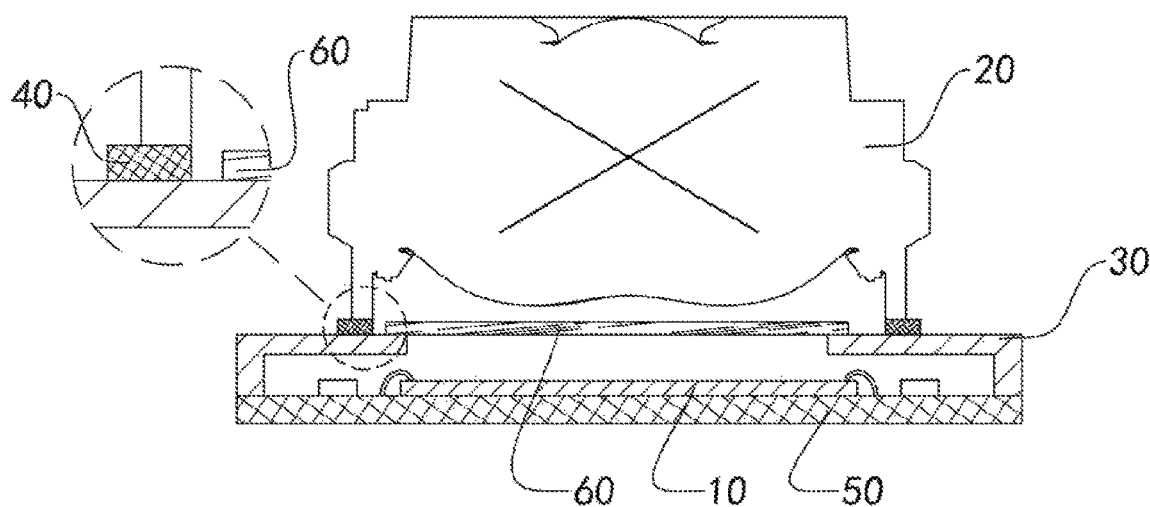
FIG. 5B is a cross-sectional schematic diagram of yet another modified embodiment of the fixed-focus photographing module according to the above preferred embodiment of the present disclosure.

FIG. 5B is yet another modified embodiment of the fixed-focus photographing module. In this embodiment, the top surface of the lens assembly holder 30 is a planar structure, that is, the lens assembly holder 30 does not have a first groove 3003 and a second groove 3004.

The glue layer 40 is disposed between the top end of the integrated base 3000 and the optical lens assembly 20. The optical filtering element 60 is disposed on the top end of the integrated base 3000. More specifically, the optical filtering element 60 is located at the interior of the optical lens assembly 20.

FIGS. 6-10 are schematic diagrams showing a process of performing a focusing operation on the fixed-focus photographing module by the focusing apparatus in a process of packaging the fixed-focus photographing, where the focusing apparatus includes a computing device 70 and a focusing mechanism 80. The computing device 70 may control the focusing mechanism 80 to perform the focusing operation on the photographing module and the photographing module to perform the operation of capturing a testing image, through a wired or wireless connection, such as Bluetooth technology, Wi-Fi technology, or network technology.

The focusing mechanism 80 includes a lens assembly holding apparatus 81 and a photosensing assembly holding apparatus 82, where the lens assembly holding apparatus 81 can hold, at the exterior of the optical lens assembly 20, the optical lens assembly 20, and more specifically, it may hold the optical lens assembly 20 at the end portion, or hold the optical lens assembly 20 at the outer peripheral surface of the optical lens assembly 20. It is worth mentioning that in the prior art, because the above-mentioned lens barrel is required, an external adjusting apparatus cannot directly hold the lens assembly on the outer peripheral surface of the assembly, usually an adjustment knob is adopted to buckle with the end portion of the lens assembly, and then the focusing operation is performed. However, in the present disclosure, the lens assembly holding apparatus 81 may be sleeved on the optical lens assembly 20, and the focusing operation may be performed at the side surface of the optical lens assembly 20, that is, rather than adjusting the position of the lens assembly in the interior of the base body 33P and the lens barrel 34P as in the prior art, a new external cooperation structure is provided for performing the focusing process. The photosensing assembly holding apparatus 82 causes the lens assembly holder 30 or the circuit board 50 to be held. It is worth mentioning that the holding mode of the lens assembly holding apparatus 81 for holding the optical lens assembly 20 is not limited. For example, the lens assembly holding apparatus 81 and the optical lens assembly 20 may be fixed in modes such as screw thread, limit, buckle, UV dissociation glue, pressure sensitive adhesive, hot melt material, magnetic adsorption, electrostatic adsorption or vacuum adsorption. It may be understood by those skilled in the art that the above-listed methods for fixing the lens assembly holding apparatus 81 and the optical lens assembly 20 are merely illustrative descriptions to illustrate the advantages and features of the focusing apparatus of the present disclosure, but do not constitute limitations on the content and scope of the focusing apparatus of the present disclosure. The photosensing assembly holding apparatus 82 may be any suitable holding apparatus for the structure of the photographing module other than the optical lens assembly 20, such as may be formed with a holding groove having the circuit board 50, the photosensing component 10, the optical filtering element 60 and the lens assembly holder 30 is limited in the holding groove, and the circuit board 50 or the lens assembly holder 30 is further laminated. In the focusing operation, the photosensing component may be fixed while the position of the optical lens assembly 20 is adjusted; or the optical lens assembly 20 may be fixed while the position of the photosensing component is adjusted, to implement the adjustment of the relative positron between the optical lens assembly 20 and the lens assembly holder 30, to optically align the optical lens assembly 20 and the photosensing component 10.

Figure 6:
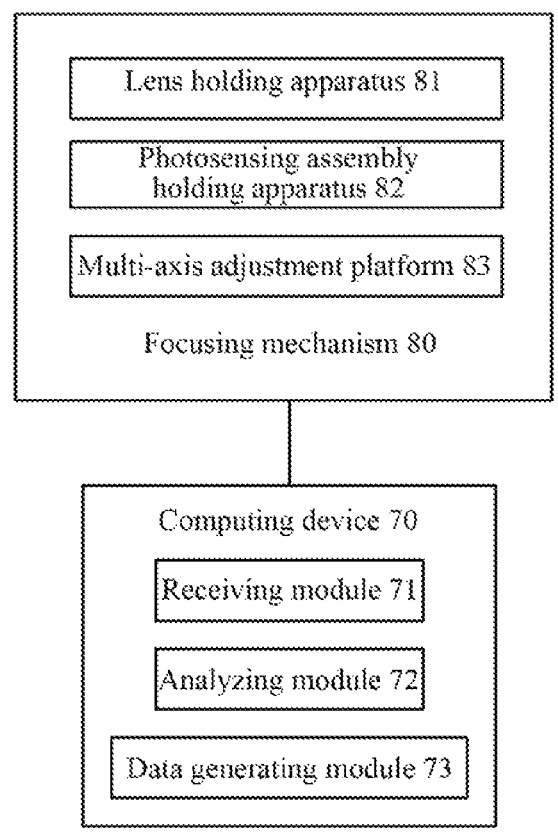
FIG. 6 is a block schematic diagram of a focusing apparatus according to the above preferred embodiment of the present disclosure.
Figure 7:
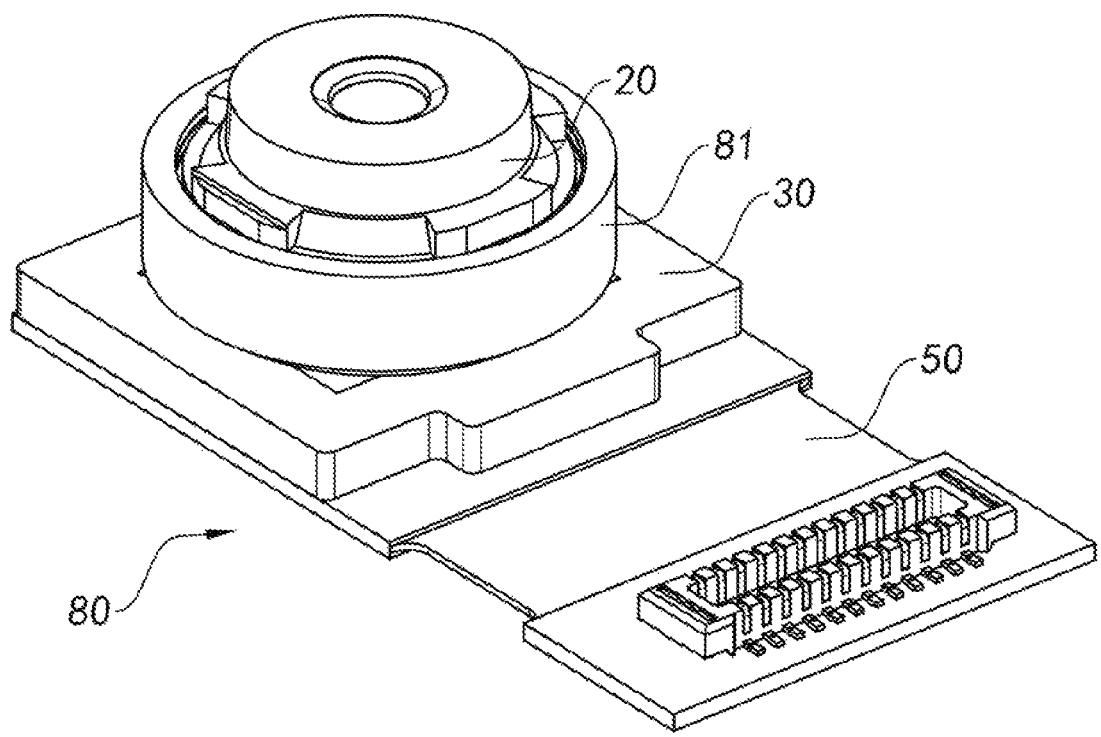
FIG. 7 is a schematic diagram of a process of the focusing apparatus using the lens assembly holding apparatus to focus the fixed-focus photographing module according to the above preferred embodiment of the present disclosure.
Figure 8:
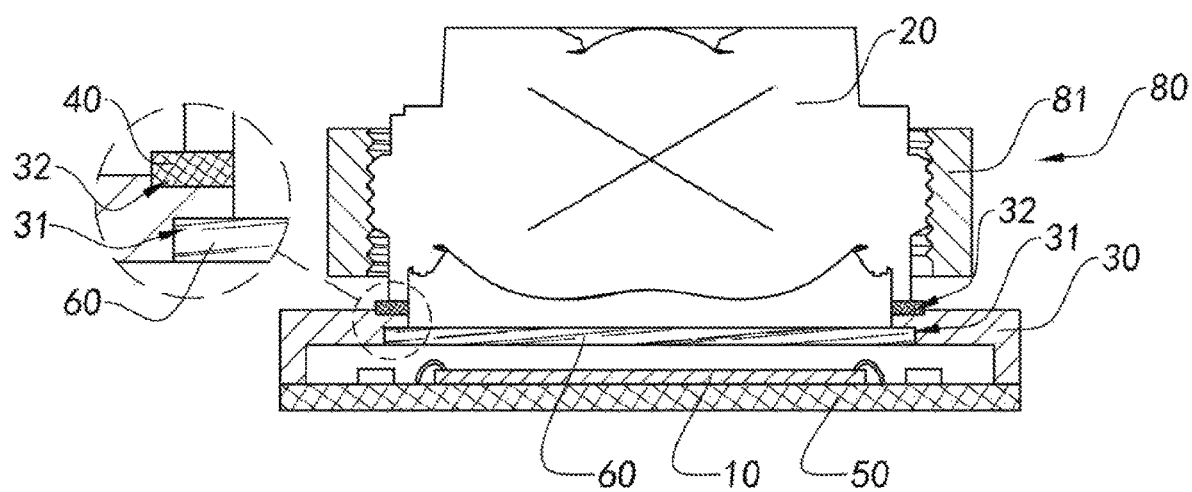
FIG. 8 is a cross-sectional schematic diagram of the process of the focusing apparatus focusing the fixed-focus photographing module according to the above preferred embodiment of the present disclosure.
Figure 9:
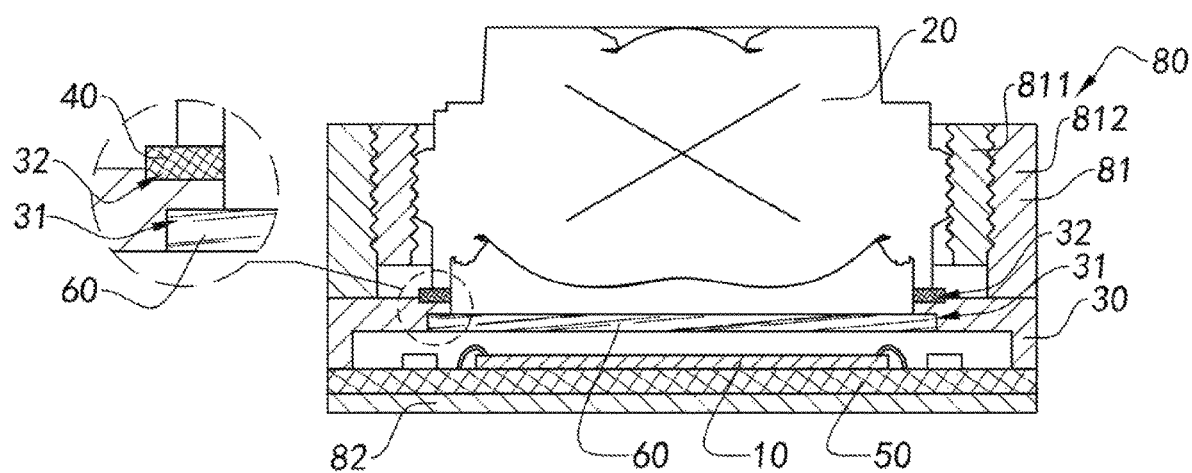
FIG. 9 is a schematic diagram of the process of the focusing apparatus focusing the fixed-focus photographing module according to the above preferred embodiment of the present disclosure.
Figure 10:
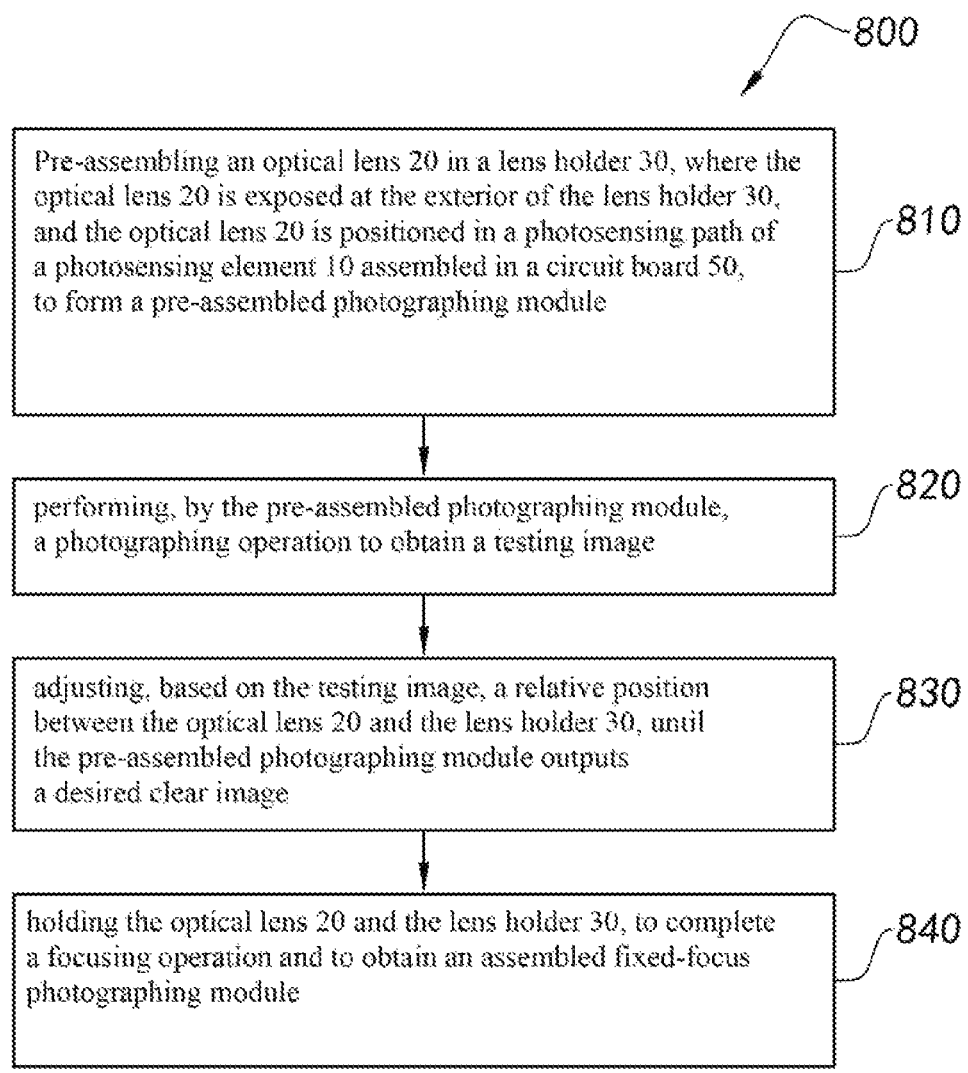
FIG. 10 is a flowchart of the process of the focusing apparatus focusing the fixed-focus photographing module according to the above preferred embodiment of the present disclosure.

Referring to FIG. 6 and FIG. 9, a schematic diagram of performing a focusing process on the fixed-focus photographing module by the focusing apparatus in the assembly process of the fixed-focus photographing module according to this embodiment of the present disclosure is illustrated. The focusing apparatus includes the computing device 70 and the focusing mechanism 80, and the computing device 70 may control the focusing mechanism 80 to perform the focusing operation on the photographing module and the photographing module to perform the operation of capturing a testing image, through a wired or wireless connection, such as Bluetooth technology, Wi-Fi technology, or network technology.

The focusing mechanism 80 includes a lens assembly holding apparatus 81 and a photosensing assembly holding apparatus 82, where the lens assembly holding apparatus 81 can hold, at the exterior of the optical lens assembly 20, the optical lens assembly 20, and more specifically, it may hold the optical lens assembly 20 at the end portion, or hold the optical lens assembly 20 on the outer peripheral side surface of the optical lens assembly 20. It is worth mentioning that in the prior art, because the above-mentioned lens barrel is required, an external adjusting apparatus cannot directly hold the lens assembly at the outer peripheral side surface of the lens assembly, usually an adjustment knob is adopted to buckle with the end portion of the lens assembly, and then the focusing operation is performed. However, in the present disclosure, the lens assembly holding apparatus 81 may be sleeved on the optical lens assembly 20, to detachably hold the optical lens assembly 20 from the exterior of the optical lens assembly 20, holding modes may be adopted to detachably hold the optical lens assembly 20 from the exterior of the optical lens assembly 20 directly or indirectly, for example, detachably hold the optical lens assembly from the exterior of the optical lens assembly such as screw thread, vacuum, releasable adhesive method, or magnetic fastening, as such the optical lens assembly 20 is stably and accurately adjusted. That is, rather than adjusting the position of the lens in the interior of the base body 33P and the lens barrel 34P as in the prior art, a new external cooperation structure is provided for performing the focusing process, and the photosensing assembly holding apparatus 82 causes the lens assembly holder 30 to be held. It is worth mentioning that the holding modes of the lens assembly holding apparatus 81 for holding the optical lens assembly 20 is not limited. For example, the lens assembly holding apparatus 81 and the optical lens assembly 20 may be bolded in modes such as screw thread, limit, buckle, UV dissociation glue, hot melt material or vacuum adsorption. It may be understood by those skilled in the art that the above-listed modes for holding the lens assembly holding apparatus 81 and the optical lens assembly 20 are merely illustrative descriptions to illustrate the advantages and features of the focusing apparatus of the present disclosure, but do not constitute limitations on the content and scope of the focusing apparatus of the present disclosure. The photosensing assembly holding apparatus 82 may be any suitable holding apparatus for the structure of the photographing module other than the optical lens assembly 20, such as may be formed with a fixing groove, a photosensing assembly having the circuit board 50, the photosensing component 10, the optical filtering element 60 and the lens assembly holder 30 is limited in the fixing groove, and the circuit board 50 or the lens assembly holder 30 is further laminated. In the focusing operation, the photosensing component 10 may be fixed while the position of the optical lens assembly 20 is adjusted; or the optical lens assembly 20 may be fixed while the position of the photosensing assembly 10 is adjusted, to implement the adjustment of the relative position between the optical lens assembly 20 and the lens assembly holder 30, to optically align the optical lens assembly 20 and the photosensing component 10.

Preferably, in some embodiments of the present disclosure, the lens assembly holding apparatus 81 and the optical lens assembly 20 are detachably bolded by means of screw thread. For example, the outside of the optical lens assembly 20 has an external thread structure, and the inside of the lens assembly holding apparatus 81 has an internal thread structure of the same pitch, so that the optical lens assembly 20 and the lens assembly holding apparatus 81 hold the optical lens assembly 20 in a detachably rotatable mode.

It is worth mentioning that the lens assembly holding apparatus 81 may hold the optical lens assembly 20 from the side or the top of the optical lens assembly 20. It should be understood by those skilled in the art that the position at which the lens assembly holding apparatus 81 holds the optical lens assembly 20 is not limited by the present disclosure.

The lens assembly holding apparatus 81 includes an inner sleeve 811 and an outer bracket 812. The inner sleeve 811 is adapted to be detachably held to an outside surface of the optical lens assembly 20, and the outer bracket 812 surrounds the outside of the inner sleeve 811 for operating on the inner sleeve 811, to perform a focusing operation on the optical lens assembly 20.

Specifically, in this embodiment of the present disclosure, the inner sleeve 811 has an external thread structure, the outer bracket 812 has an internal thread structure, the internal thread structure of the outer bracket 812 and the external thread structure of the inner sleeve 811 are of same pitcher facilitating that the outer bracket 812 drives the inner sleeve 811 to rotate to perform a uniform rotation. So that when the optical lens assembly 20 is not fixed, a precise adjustment is performed on the optical lens assembly 20. When the optical lens assembly 20 is fixed, the inner sleeve 811 and the optical lens assembly 20 may be separated by operating the outer bracket 812, thereby reducing direct influence on the optical lens assembly 20.

It is worth mentioning that, through the adjustment by thread rotation, manual operation on relatively simple automation equipment may replace the linear automatic focusing device of similar precision h, which may significantly reduce the cost and reduce space occupation of the device. Moreover, since the adjustment direction in the thread adjustment is fixed to some extent, the possibility of occurrence of the deviation is small, thereby improving the manual focusing precision of the optical lens assembly 20.

In some embodiments, the optical lens assembly 20 has an external thread structure, and the inner sleeve 811 may have an internal thread structure inside, which cooperates with the external thread structure of the optical lens assembly 20. That is, the mode in which the inner sleeve 811 is connected to the optical lens assembly 20 may be a detachable holding mode of a screw thread connection. In some other embodiments, the outside of the optical lens assembly 20 may not have the external thread structure, and the inner sleeve 811 may not have the internal thread structure inside, but they may be detachably held by other means, such as by vacuum adsorption, releasable adhesive method, or magnetic fixation.

It is worth mentioning that, in some embodiments of the present disclosure, the internal thread structure of the outer bracket 812, the external thread structure of the sleeve 811, and the internal thread structure of the sleeve 811 and the external thread structure of the optical lens assembly 20 are of same pitch, so that the optical lens assembly may be precisely adjusted by a rotation adjustment mode during the adjustment process. After the adjustment is completed and the optical lens assembly 20 is fixed, the lens assembly holding apparatus 81 may be separated from the optical lens assembly 20 by rotation, thus the fixing effect of the optical lens assembly 20 is not affected or less affected.

In the process of packaging the fixed-focus photographing module provided by a specific example of the present disclosure, the photosensing component 10 is fixed to the circuit board 50, and the photosensing component 10 and the circuit board 50 are electrically connected by a wire bonding process, to achieve mounting and electrically connecting the photosensing component 10 to the circuit board 50. Preferably, the circuit board 50 is a PCB circuit board capable of ensuring the flatness of the photosensing component 10. After the optical filtering element 60 is packaged in the lens assembly holder 30, the circuit board 50 and the lens assembly holder 30 are packaged, such that the optical filtering element 60 is positioned in the photosensing path of the photosensing component 10. Glue is dispensed at a corresponding position of the lens assembly holder 30 to allow glue to spread on the lens assembly holder 30. Preferably, the amount of glue depends on the glue performance and the spreading area, and therefore, the amount of glue does not constitute a limitation on the fixed-focus photographing module and the focusing apparatus of the present disclosure. The optical lens assembly 20 is placed on the lens assembly holder 30 such that the lower end surface of the optical lens assembly 20 is in contact with glue, and at this time, the optical lens assembly 20 and the photosensing component 10 are in a substantially matching position. In another packaging process, the lens assembly holder 30 may be first integrally molded on the circuit board 50, then the photosensing component 10 may be fixed and electrically connected to the circuit board 50, and the optical filtering element 60 is mounted on the lens assembly holder 30, and finally the glue is dispensed between the optical lens assembly 20 and the lens assembly holder 30, and curing the glue after the relative position between the two is adjusted.

The lens assembly holding apparatus 81 holds, at the exterior of the optical lens assembly 20, the optical lens assembly 20, and the lens assembly holder 30 is held by the photosensing assembly holding apparatus 32, so that the optical lens assembly 20 is held in the photosensing path of the photosensing component 10. Preferably, in one embodiment, the glue may be semi-cured to prevent fluid-like glue from contaminating the photosensing path of the photosensing component 10 when the fixed-focus photographing module is being focused, for example, preventing the fluid-like glue from contaminating the optical lens assembly 20 or the optical filtering element 60 or blocking the photosensing path of the photosensing component 10 when the fixed-focus photographing module is being focused.

A test form is disposed at a front portion of the optical lens assembly 20, and the photosensing component 10 is powered by the circuit board 50 to enable light reflected or transmitted by the test form to enter the interior of the fixed-focus photographing module from the optical lens assembly 20, to be received and photoelectrically converted by the photosensing component 10 after the light is filtered by the optical filtering element 60, to generate an image associated with the object. Subsequently, the image is received by the computing device 70, and the computing device 70 can generate a focusing signal by analyzing the image, where the focusing signal includes deviation angles and displacements of the optical lens assembly 20 and the photosensing component 10, for example, the focusing signal includes the flatness of the optical lens assembly 20 and the photosensing component 10, an amplitude of the distance which should be adjusted, and the like.

The focusing mechanism. 80 receives the focusing signal, and adjusts, based on the focusing signal, the positions of the optical lens assembly 20 and the photosensing component 10 packaged in the lens assembly holder 30 through the lens assembly holding apparatus 81 and the photosensing assembly holding apparatus 82, to complete the focusing operation on the fixed-focus photographing module. In one embodiment, the photosensing assembly holding apparatus 82 may hold the lens assembly holder 30 in the initial position, and the lens assembly holding apparatus 81 adjusts the position of the optical lens assembly 20. In another embodiment, the lens assembly holding apparatus 81 may hold the optical lens assembly 20 in the initial position, and the photosensing assembly holding apparatus 82 adjusts the position of the lens assembly holder 30. Nevertheless, in another embodiment, the lens assembly holding apparatus 81 and the photosensing assembly holding apparatus 82 can synchronously adjust the positions of the optical lens assembly 20 and the lens assembly holder 30. Accordingly, the focusing mechanism 80 may further include a multi-axis adjustment platform 83 to precisely adjust the position of the lens assembly holding apparatus 81 or the photosensing assembly holding apparatus 82 in a plurality of directions.

After performing the focusing operation on the fixed-focus photographing module, the glue is cured to form the glue layer 40 between the optical lens assembly 20 and the lens assembly holder 30, where the glue layer 40 is used for sealing a gap between the optical lens assembly 20 and the lens assembly holder 30, to prevent solid particle contaminants generated on the outer surface of the optical lens assembly 20 when the optical lens assembly 20 is fixed by the lens assembly holding apparatus 81 from entering the interior from the exterior of the fixed-focus photographing module through the joint between the optical lens assembly 20 and the lens assembly holder 30, thereby facilitating improvement of the imaging quality of the fixed-focus photographing module.

It is worth mentioning that the computing device 70 may be any device capable of generating the focusing signal by analyzing the image, for example, the computing device 70 may be a smart device such as a desktop computer, a notebook computer, a server, a digital assistant, or a combination of two and more than two of the aforementioned smart devices or any device incorporating the aforementioned smart device.

Preferably, the computing device 70 includes a receiving module 71, an analyzing module 72, and a data generating module 73 communicably connected with each other. The receiving module 71 is capable of receiving the image captured by the fixed-focus photographing module. The analyzing module 72 analyzes the image, and the data generating module 73 generates the focusing signal based on an analysis result of the analyzing module 72, where the focusing mechanism 80 communicably connected to the data generating module 73 is capable of adjusting, based on the focusing signal and through the lens assembly holding apparatus 81 and the photosensing assembly holding apparatus 82, the positions of the optical lens assembly 20 and the photosensing component 10 packaged in the lens assembly holder 30, to complete the focusing operation on the fixed-focus photographing module.

In the process of packaging the fixed-focus photographing module provided by another specific example of the present disclosure, the photosensing component 10 is fixed to the circuit board 50, and the photosensing component 10 and the circuit board 50 is electrically connected through a wire bonding process, to mount the photosensing component 10 to the circuit board 50. The optical filtering element 60 is packaged in the lens assembly holder 30. Glue is dispensed at a corresponding position of the lens assembly holder 30 to allow glue (adhesive) to coat on lens assembly holder 30. The optical lens assembly 20 is disposed on the lens assembly holder 30 such that the lower end surface of the optical lens assembly 20 comes into contact with the glue. Glue is cured to form the glue layer 40 between the optical lens assembly 20 and the lens assembly holder 30, where the glue layer 40 is used to seal the joint between the optical lens assembly 20 and the lens assembly holder 30. Glue is dispensed at a corresponding position of the lens assembly holder 30 such that glue coats on the lens assembly holder 30, and the circuit board 50 is disposed on the lens assembly holder 30, then, the optical lens assembly 20 and the photosensing component 10 is a substantially matching position.

The lens assembly holding apparatus 81 holds, at the exterior of the optical lens assembly 20, the optical lens assembly 20, and the circuit board 50 is held by the photosensing assembly holding apparatus 82, so that the optical lens assembly 20 is held in the photosensing path of the photosensing component 10.

A test form and a light source are disposed at the front of the optical lens assembly 20, and the photosensing component 10 is powered by the circuit board 50, enabling the light reflected by the test form to enter the interior of the fixed-focus photographing module from the optical lens assembly 20, to be received and photoelectrically converted by the photosensing component 10 after the light is filtered by the optical filtering element 60, to generate an image associated with the object. Subsequently, the image is received by the computing device 70, and the computing device 70 can generate a focusing signal by analyzing the image, where the focusing signal includes deviation angles and displacements of the optical lens assembly 20 and the photosensing component 10, for example, the focusing signal includes the flatness of the optical lens assembly 20 and the photosensing component 10, an amplitude of the distance which should be adjusted, and the like.

The focusing mechanism 80 receives the focusing signal and adjusts the positions of the optical lens assembly 20 and the photosensing component 10 through the lens assembly holding apparatus 81 and the photosensing assembly holding apparatus 82 based on the focusing signal, to complete the focusing operation on the fixed-focus photographing module. In one embodiment, the photosensing assembly holding apparatus 82 may hold the photosensing component 10 in an initial position, and the lens assembly holding apparatus 81 adjusts the position of the optical lens assembly 20. In another embodiment, the lens assembly holding apparatus 81 may hold the optical lens assembly 20 in an initial position, and the photosensing assembly holding apparatus 82 adjusts the position of the photosensing component 10. Nevertheless, in another embodiment, the lens assembly holding apparatus 81 and the photosensing assembly holding apparatus 82 can synchronously adjust the positions of the optical lens assembly 20 and the photosensing component 10. After the focusing operation is performed on the fixed-focus photographing module, the glue is cured to package the circuit board 50 and the lens assembly holder 30.

Correspondingly, the focusing method 800 of the fixed-focus photographing module of the present disclosure includes the following steps:

Step 810 of pre-assembling the optical lens assembly: pre-assembling an optical lens assembly 20 into a lens assembly holder 30, where the optical lens assembly 20 is exposed at the exterior of the lens assembly holder 30, and the optical lens assembly 20 is positioned in a photosensing path of a photosensing component 10 assembled into a circuit board 50, to form a pre-assembled photographing module;

Step 820 of obtaining a testing image: performing, by the pre-assembled photographing module, a photographing operation to obtain a testing image;

Step 830 of focusing: adjusting a relative position between the optical lens assembly 20 and the lens assembly holder 30 based on the testing image, until the pre-assembled photographing module outputs a required clear image; and Step 840 of completing module assembly: holding the optical lens assembly 20 and the lens assembly holder 30, to complete a focusing operation and to obtain an assembled fixed-focus photographing module.

Figure 11:
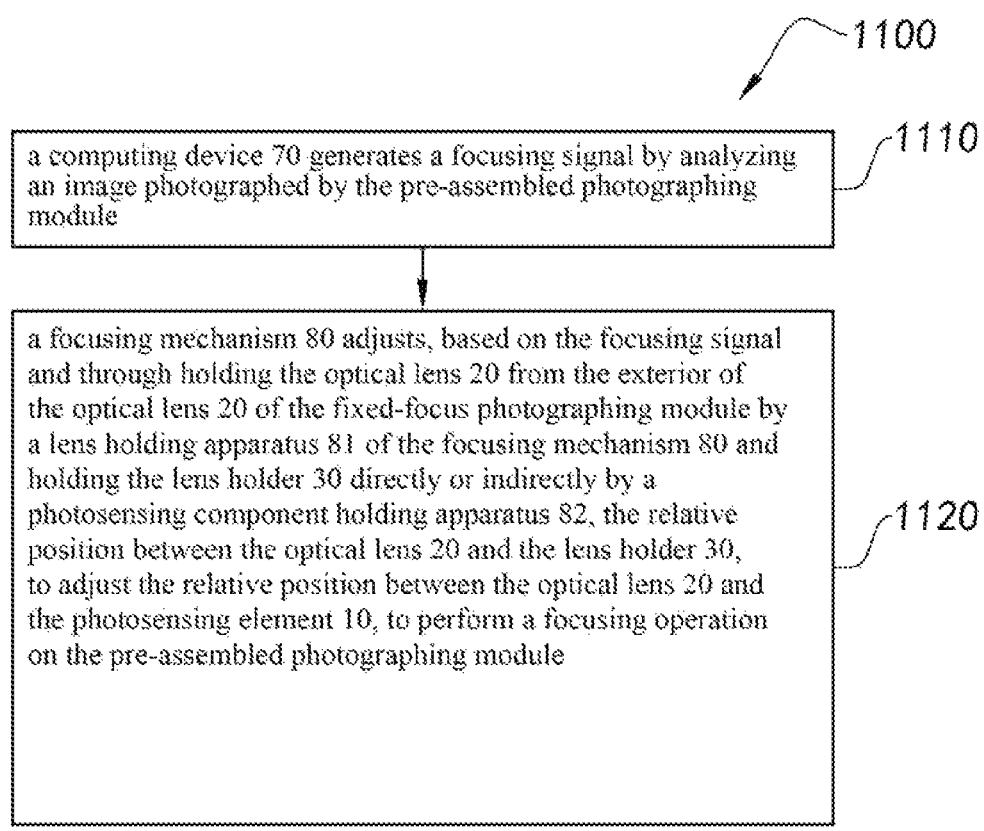
FIG. 11 is a block schematic diagram of a process of adjusting position of an optical lens assembly of the fixed-focus photographing module according to the above preferred embodiment of the present disclosure.

Referring to FIG. 11, the present disclosure further provides a method 1100 for adjusting a relative position between the optical lens assembly 20 and the photosensing component 10 of a fixed-focus photographing module, where the focusing method 1100 includes the following steps:

Step 1110, (I) a computing device 70 generates a focusing signal by analyzing an image captured by the pre-assembled photographing module; and Step 1120, (II) a focusing mechanism 80 adjusts, based on the focusing signal and through holding the optical lens assembly 20 from the exterior of the optical lens assembly 20 of the fixed-focus photographing module by a lens assembly holding apparatus 81 of the focusing mechanism 80 and holding the lens assembly holder 30 directly or indirectly by a photosensing component holding apparatus 82, a relative position between the optical lens assembly 20 and the lens assembly holder 30 to adjust the relative position between the optical lens assembly 20 and the photosensing component 10, to perform a focusing operation on the pre-assembled photographing module.

Further, before the step (I), the method further includes the steps of:

holding the optical lens assembly 20 in a photosensing path of the photosensing component 10; and photographing the test form located in an optical path of the optical lens assembly 20 after the photosensing component 10 is powered to obtain the image associated with the test form.

Further, in the step (I), the method further includes the steps of:

a receiving module 71 receives the image captured by the fixed-focus photographing module;

an analyzing module 72 analyzes the image; and a data generating module 73 generates the focusing signal based on the analysis result of the analyzing module 72, so that the focusing mechanism 80 performs the focusing operation on the fixed-focus photographing module based on the focusing signal.

Further, in the above method, the photosensing component 10 is mounted to a circuit board 50 packaged on a lens assembly holder 30, and the photosensing assembly holding apparatus 82 holds the lens assembly holder 30 or the circuit board 50 to fix the position of the photosensing component 10.

As shown in FIG. 12, a cross-sectional schematic diagram of a fixed-focus photographing module according to a second preferred embodiment of the present disclosure is shown.

In this embodiment of the present disclosure, the fixed-focus photographing module includes a photosensing assembly 100 and an optical lens assembly 20, where the optical lens assembly 20 is packaged on the top of the photosensing assembly 100, and the optical lens assembly 20 is positioned in a photosensing path of the photosensing assembly 100.

The photosensing assembly 100 includes a photosensing component 10, a circuit board 50, and an integrated base 3000. The photosensing component 10 is electrically connected to the circuit board 50. The integrated base 3000 is integrally formed on the circuit board 50.

The integrated base 3000 includes a molded body 3001 and has a light window 3002. The molded body 3001 is integrally formed on the circuit board 50 by molding, and forms the light window 3002 in the middle portion for providing a light passage for the photosensing component 10.

In this embodiment of the present disclosure, the optical lens assembly 20 is directly packaged on the top of the integrated base 3000, such that the optical lens assembly 20 is positioned in the photosensing path of the photosensing component 10 and the fixed-focus photographing module is formed. That is, the fixed-focus photographing module of the present disclosure does not need to provide the lens barrel structure in the prior art, and in this way, the volume of the fixed-focus photographing module around the optical lens assembly 20 can be reduced, so that when the fixed-focus photographing module is mounted on an electronic device, the fixed-focus photographing module can occupy the space of the electronic device as little as possible, thereby enabling the electronic device to leave more space for the installation of other components.

In addition, the fixed-focus photographing module of the present disclosure does riot need to provide the lens barrel structure in the prior art, but directly packages the optical lens assembly 20 on the integrated base 3000. In this way, the materials used can be reduced in order to reduce the cost of the fixed-focus photographing module, thereby improving the product competitiveness of the fixed-focus photographing module.

Further, in this embodiment of the present disclosure, the integrated base 3000 is integrally disposed on the circuit board 50 by molding, so that the integrated base 3000 has better surface flatness for providing a flatter mounting surface for the optical lens assembly 20.

The photosensing assembly 100 includes a circuit element 51, the circuit element 51 is electrically connected to the circuit board 50 for the photosensing operation of the photosensing component 10. The circuit element 51 may be, for example but not limited to, a resistor, a capacitor, a diode, a triode, a potentiometer, a relay, a driver, and the like.

It is worth mentioning that the molded body 3001 may clad the circuit element 51 inside, so that the circuit element 51 may not be directly exposed to space, and more specifically, may not be exposed to the enclosed environment connected to the photosensing component 10. Different from the existing modes of circuit devices in the conventional photographing module, such as the resistor or the capacitor protruding out of the circuit board 50, the present disclose prevents dust and debris from staying in the circuit element 51 and contaminating the photosensing component 10. In this embodiment of the present disclosure, the circuit element 51 protrudes out of the circuit board 50 is used as an example, while in other embodiments of the present disclosure, the circuit element 51 is embedded inside the circuit board 50 without protruding out of the circuit board 50. It should be understood by those skilled in the art that the structure, type and set location of the circuit element 51 are not limited in the present disclosure. It may be understood that in the conventional photographing module, the circuit device protrudes out from the circuit board 50 while the base can only be mounted outside the circuit element 51. Therefore, the circuit devices and the base both need a certain space and position, so the circuit board 50 requires a higher lateral size. For the photographing module based on the integrated packaging process of the present disclosure, the molded body 3001 is integrally packaged in the circuit board 50, and clads the circuit element 51. Therefore, the molded body 3001 and the circuit element 51 overlap each other in space, thereby increasing the space that may be set inward by the molded body 3001 and reducing the need for the external extension of the circuit board 50. The lateral dimension of the photographing module is reduced to meet the miniaturization requirement of the device.

It is worth mentioning that the molded body 3001 clading the circuit element 51 has the advantage of protecting the circuit element 51 from being contaminated and mistakenly touched, while bringing advantages to the corresponding photographing module, but it should be understood by those skilled in the art that the molded body 3001 is not limited to covering the circuit element 51. That is, in other embodiments of the present disclosure, the molded body 3001 may be directly molded on the circuit board 50 not having a protruding circuit element 51, or at a different location such as the exterior or surrounding of the circuit element 51.

In this embodiment of the present disclosure, the molded body 3001 protrudingly surrounds the outside of the photosensing component 10, and in particular, the molded body 3001 is in integrally closed connection so that it has good sealing property, so that when the optical lens assembly 20 is mounted in the photosensing path of the photosensing component 10, the photosensing component 10 is sealed inside, thereby forming a corresponding enclosed inner space.

The photosensing component 10 is electrically connected to the circuit board 50 through at least one connecting wire 11. The connection wire 11 may be implemented as, for example, but not limited to, gold wire, copper wire, aluminum wire, silver wire, pad, wire and pins.

Specifically, when manufacturing the photosensing assembly 100, a conventional circuit board 50 may be selected as the circuit board 50 and molding is performed on the surface of the circuit board 50. For example, in one embodiment, the circuit board 50 after a SMT (Surface Mount Technology) process may be integrally packaged by insert molding process using a molding mound, for example, a molding package, to form the molded body 3001, or the molded body 3001 is formed by a commonly used compression molding process in semiconductor packaging. Further, the photosensing components 10 are mounted to the circuit board 50, and then the photosensing components 10 are electrically connected with the circuit board 50, such as by a golden wire bonding electric connection. The circuit board 50 may be selected to be, for example, but not limited to, Rigid-flex board, ceramic substrate (without flex board), PCP rigid board (without flex board), etc. The forming method of the molded body 3001 may be selected as, for example, but not limited to, injection molding process, compression moulding process, etc. The materials that may be selected for the molded body 3001 are, for example, but not limited to, nylon, LCP (Liquid Crystal Polymer), PP (Polypropylene) for injection molding process and epoxy resin for compression moulding process. It should be understood by those skilled in the art that the aforementioned alternative manufacturing methods and alternative materials are not limited by the present disclosure, but merely as examples to illustrate implementable methods of the present disclosure.

In other embodiments of the present disclosure, the process of manufacturing the photosensing assembly 100 may also be as follows: first performing SMT process on the circuit board 50, then mounting the photosensing component 10 to the circuit board 50, and electrically connecting the photosensing component 10 with the circuit board 50, such as a gold wire bonding electric connection, and then integrally packaging the circuit board 50, such as a molding packaging. The molded body 3001 is formed through the insert molding process, or by compression molding process commonly used in semiconductor packaging. It should be understood by those skilled in the art that the manufacturing sequence of the photosensing assembly 100 is not limited by the present disclosure.

In the process of packaging the fixed-focus photographing module of the present disclosure, the position of the optical lens assembly 20 relative to the photosensing component 10 is adjusted by holding the optical lens assembly 20 from the exterior of the optical lens assembly 20 by the focusing mechanism, so as to improve the imaging quality of the fixed-focus photographing module, such as actively calibrating the optical lens assembly and/or the photosensing assembly, so that the optical lens assembly 20 is aligned with the optical axis of the photosensing assembly 100. Therefore, in this process, even if the focusing mechanism causes the optical lens assembly 20 to generate contaminants such as solid particles, the contaminants such as solid particles do not enter the interior of the fixed-focus photographing module to prevent stains caused by the contaminants such as solid particles, thereby ensuring the imaging quality of the fixed-focus photographing module. After the contaminants such as solid particles are generated, the contaminants such as solid particles may adhere to the outer surface of the fixed-focus photographing module at most, and after the fixed-focus photographing module is packaged, the contaminants such as solid particles that adhere to the outer surface of the fixed-focus photographing module can be removed by cleaning, to ensure the imaging quality of the fixed-focus photographing module during use when configured in the electronic device.

Figure 12A:
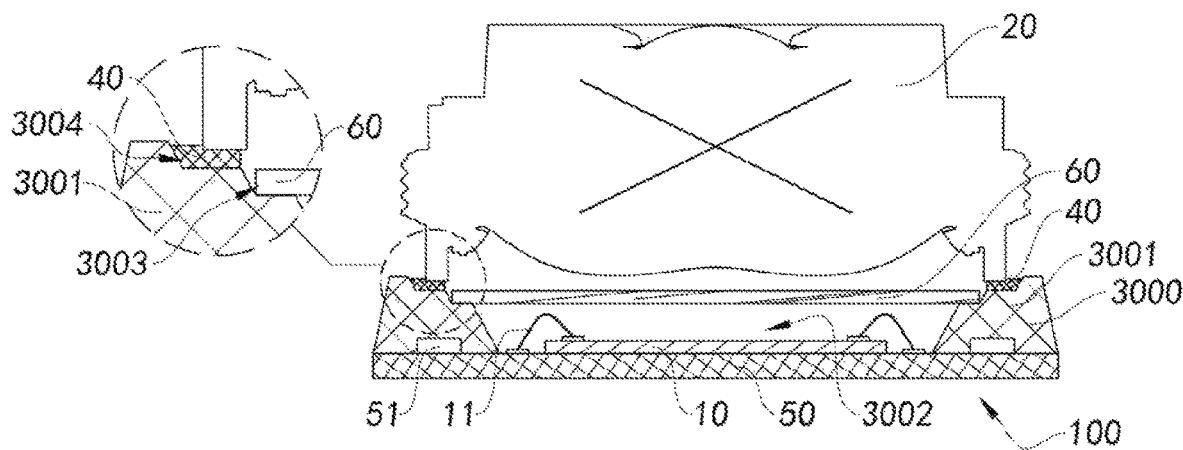
FIG. 12A is a cross-sectional schematic diagram of a fixed-focus photographing module according to a second preferred embodiment of the present disclosure.

Further, as shown in FIG. 12A, the fixed-focus photographing module includes a glue layer 40, the glue layer 40 is located between the optical lens assembly 20 and the integrated base 3000 for packaging the optical lens assembly 20 directly in the integrated base 3000.

Correspondingly the glue layer 40 is in an annular shape and connects the annular outer edge of the optical lens assembly 20 with the integrated base 3000. Preferably, the glue layer 40 is formed of opaque materials. It is worth mentioning that the glue layer 40 can not only connect the optical lens assembly 20 and the integrated base 3000, but also be used to seal the joint between the optical lens assembly 20 and the integrated base 3000, thereby preventing contaminants such as solid particles or external contaminants or external light from entering the interior of the fixed-focus photographing module from the exterior of the fixed-focus photographing module through the joint between the optical lens assembly 20 and the integrated base 3000, thus ensuring the imaging quality of the fixed-focus photographing module.

The glue layer 40 is formed at the joint of the optical lens assembly 20 and the integrated base 3000. Specifically, the dispensing is selectively performed at a corresponding position of at least one of the optical lens assembly 20 and the integrated base 3000. After the dispensing operation is completed, the lower end surface of the optical lens assembly 20 is mounted on the integrated base 3000 for placing the glue between the optical lens assembly 20 and the integrated base 3000, and the fixed-focus photographing module is focused. When focusing, the optical lens assembly 20 may be held from the outside of the optical lens assembly 20. After the focusing is completed, the glue is cured to form the glue layer 40 between the optical lens assembly 20 and the integrated base 3000. Preferably, dispensing may be performed only at the corresponding position of the integrated base 3000 to prevent glue from contaminating the optical lens assembly 20. More preferably, the glue may be cured by irradiation of ultraviolet light (Ultraviolet Rays), i.e., the glue layer 40 may use ultraviolet curing adhesive. Of course, it may be understood by those skilled in the art that other suitable glues may also be used and the glue may be cured by other methods, such as thermal curing.

It is worth mentioning that after the dispensing operation is completed at the corresponding position of the integrated base 3000, the glue may be semi-cured to prevent the glue from contaminating the optical lens assembly 20 in the process of packaging the optical lens assembly 20 in the integrated base 3000. In other words, after the glue is applied to the integrated base 3000 by dispensing, the glue may be semi-cured to make the semi-cured glue have viscosity and plasticity. After the lower end surface of the optical lens assembly 20 is mounted on the integrated base 3000 and the focusing of the fixed-focus photographing module is completed, the glue is cured to form the glue layer 40 between the optical lens assembly 20 and the integrated base 3000. On the one hand, the glue layer 40 keeps the optical lens assembly 20 in a position after being focused, and on the other hand, the glue layer 40 seals the joint between the optical lens assembly 20 and the integrated base 3000. Of course, it is also possible to completely cure the glue to form the glue layer 40 after the focusing operation without the semi-cured state.

In the process of packaging the fixed-focus photographing module of the present disclosure, the glue layer 40 can improve the flatness of the optical lens assembly 20 and the integrated base 3000, so that the central axis of the optical lens assembly 20 can coincide with the central axis of the photosensing component 10 to improve the imaging quality of the fixed-focus photographing module. That is, the glue layer 40 can compensate for the product error of the optical lens assembly 20, the product error of the integrated base 3000 and the mounting errors of the optical lens assembly 20 and the integrated base 3000, thereby improving the imaging quality of the fixed-focus photographing module.

In this embodiment of the present disclosure, the optical filtering element 60 is disposed between the photosensing component 10 and the optical lens assembly 20 for improving the imaging quality of the fixed-focus photographing module. Light reflected by an object enters the interior of the fixed-focus photographing module from the optical lens assembly 20, and is further received and photoelectrically converted by the photosensing component 10 after being filtered by the optical filtering element 60, to generate an image associated with the object. That is, the optical filtering element 60 can filter stray lights in the light reflected by the object and entering from the optical lens assembly 20 into the interior of the fixed-focus photographing module, to improve the imaging quality of the fixed-focus photographing module. Specifically, the optical filtering element 60 is disposed on the integrated base 3000.

Referring to FIG. 12A, the integrated base 3000 has a first groove 3003 and a second groove 3004, and the first groove 3003 and the second groove 3004 are connected to the light window 3002, to facilitate the installation of the optical filtering element 60 and the optical lens assembly 20. In this way, the height of the fixed-focus photographing module can be effectively reduced so that the fixed-focus photographing module is particularly suitable for being applied to the electronic devices that seek to be light and thin.

More specifically, the optical filtering element 60 is mounted in the first groove 3003, and the optical lens assembly 20 is mounted in the second groove 3004. It is worth mentioning that in this embodiment of the present disclosure, the integrated base 3000 is formed by integral molding, and has good surface smoothness. Therefore, the inner surfaces of the first groove 3003 and the second groove 3004 are relatively flat, providing flat mounting surfaces for the optical filtering element 60 and the optical lens assembly 20.

That is to say, in the manufacture of the fixed-focus photographing module, medium such as glue may be applied at the bottom of the integrated base 3000 and the second groove 3004 or the optical lens assembly 20, thereby the glue layer 40 is formed between the inner surfaces of the optical lens assembly 20 and the second groove 3004, thereby the optical lens assembly 20 is stably mounted on the integrated base 3000 to form the fixed-focus photographing module. Of course, before fixing the optical lens assembly 20, the photographing module needs to be adjusted by the focusing mechanism, to adjust the relative position between the optical lens assembly 20 and the photosensing assembly 100, in order to improve the imaging quality of the fixed-focus photographing module.

In the process of the fixed-focus photographing module described in this embodiment of the present disclosure, step 1, the circuit board 50 and the photosensing component 10 may be first fixed together, and the circuit board 50 and the photosensing component 10 are electrically connected through the wire bonding process, to make the photosensing component 10 conduct with the circuit board 50.

Step 2, the optical filtering element 60 is packaged in the integrated base 3000. For example, in the example shown in FIG. 12 of the present disclosure, the optical filtering element 60 may be packaged in the second groove 3004 of the integrated base 3000.

Step 3, the circuit board 50 and the integrated base 3000 are assembled so that the optical filtering element 60 corresponds to the photosensing component 10 mounted to the circuit board 50.

Step 4, dispensing is performed on the corresponding position of the integrated base 3000. It is worth mentioning that the amount of glue may be provided as needed, such as the amount of glue being able to ensure access to the lower end surface of the optical lens assembly 20. It is worth mentioning that the amount of glue depends on its properties and coating area.

Step 5, the optical lens assembly 20 is mounted on the integrated base 3000, so that glue is located between the optical lens assembly 20 and the integrated base 3000, and the optical lens assembly 20 is guaranteed to be in the photosensing path of the photosensing component 10.

Step 6, the position of the optical lens assembly 20 relative to the photosensing component 10 is adjusted to focus the fixed-focus photographing module. Specifically, the photosensing component 10 is powered by the circuit board 50 so that the photosensing component 10 can output an image, and the fixed-focus photographing module is focused based on the clarity of the image. The method of focusing the fixed-focus photographing module may be that the focusing mechanism adjusts the position of the optical lens assembly 20 relative to the photosensing component 10 by holding the external surface of the optical lens assembly 20. Since the fixed-focus photographing module of the present disclosure focuses the fixed-focus photographing module from the exterior of the fixed-focus photographing module, even if the focusing mechanism causes the solid particle contaminants on the outer surface of the optical lens assembly 20, the solid particle contaminants do not enter the interior of the fixed-focus photographing module to improve the imaging quality of the fixed-focus photographing module. It is worth mentioning that during the focusing operation on the fixed-focus photographing module of the present disclosure, although the focal length of the fixed-focus photographing module can be adjusted by adjusting the position of the optical lens assembly 20 relative to the photosensing component 10, in other examples, the position of the photosensing module 10 relative to the optical lens assembly 20 may also be adjusted by moving the integrated base 3000, i.e., moving the photosensing assembly 100 as a whole.

Step 7, glue is cured to form the glue layer 40 between the optical lens assembly 20 and the integrated base 3000. It may be understood that, on the one hand, the glue layer 10 can be used to connect the optical lens assembly 20 and the integrated base 3000, so that the optical lens assembly 20 can be kept in the photosensing path of the photosensing component 10. On the other hand, the glue layer 40 can prevent external contaminants from entering the interior from the exterior of the fixed-focus photographing module through the joint between the optical lens assembly 20 and the integrated base 3000. On the other hand, the glue layer 40 can prevent the external light from entering the interior from the exterior of the fixed-focus photographing module through the joint between the optical lens assembly 20 and the integrated base 3000. In addition, the glue layer 40 can also compensate for the product error of the optical lens assembly 20, the product error of the integrated base 3000 and the mounting errors of the optical lens assembly 20 and the integrated base 3000, to prevent the relative inclination between the optical lens assembly 20 and the photosensing component 10, thereby improving the imaging quality of the fixed-focus photographing module.

Figure 12B:
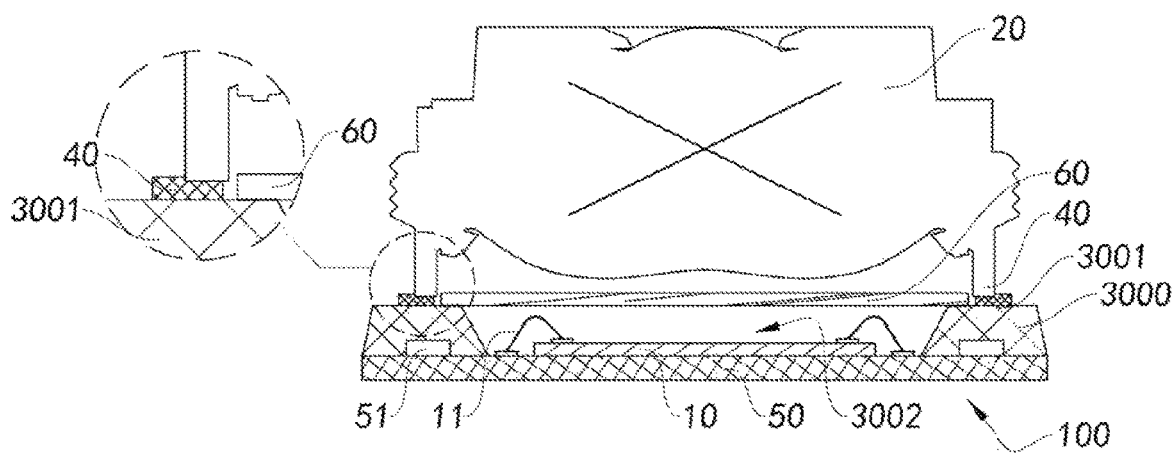
FIG. 12B is a cross-sectional schematic diagram of a modified embodiment of the fixed-focus photographing module according to the second preferred embodiment of the present disclosure.

As shown in FIG. 12B, is a modified embodiment of the fixed-focus photographing module according to the second preferred embodiment of the present disclosure. In this embodiment, the top surface of the integrated base 3000 is a plane structure, that is, the integrated base 3000 does not have the first groove 3003 and the second groove 3004.

The glue layer 40 is set between the top of the integrated base 3000 and the optical lens assembly 20. The optical filtering element 60 is set at the top of the integrated base 3000. More specifically, the optical filtering element 60 is positioned on the inner side of the optical lens assembly 20.

Figure 13:
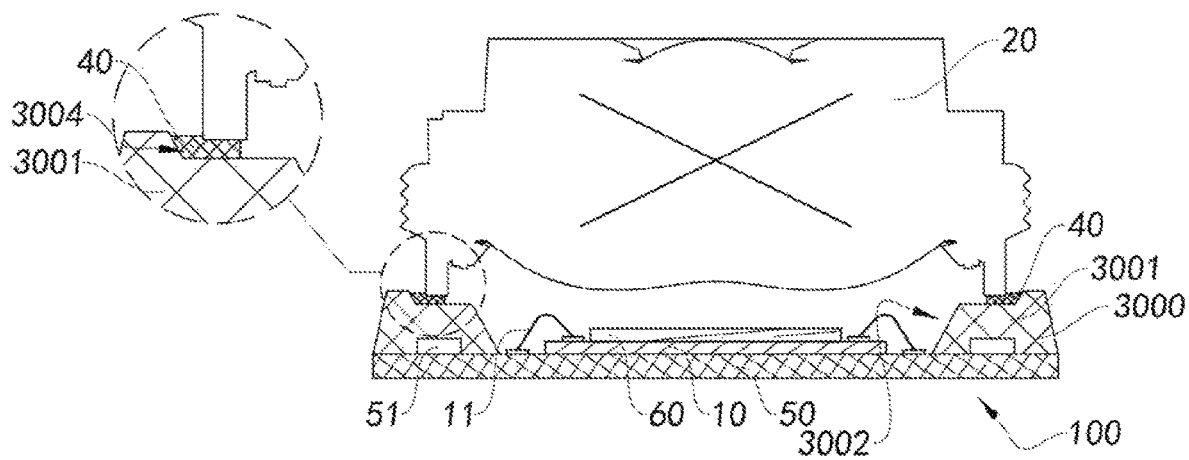
FIG. 13 is a cross-sectional schematic diagram of a first modified embodiment of the fixed-focus photographing module according to the second preferred embodiment of the present disclosure.

FIG. 13 is a first modified embodiment according to the second preferred embodiment of the present disclosure in this embodiment of the present disclosure, the optical filtering element 60 covers the photosensing component 10. The coverage mode of the optical filtering element 60 is, for example, but not limited to, covering the photosensing component 10 by bonding and fixing, for example, setting to the photosensing component 10 by compounding, for example, covering the photosensing component 10 by mounting. When the optical lens assembly 20 is packaged in the integrated base 3000 of the photosensing assembly 100, the optical filtering element 60 is kept between the optical lens assembly 20 and the photosensing component 10.

Further, the integrated base 3000 has the second groove 3004 for mounting the optical lens assembly 20, that is, in this embodiment of the present disclosure, the integrated base 3000 does not have the first groove 3003 for mounting the optical filtering element 60.

Figure 14:
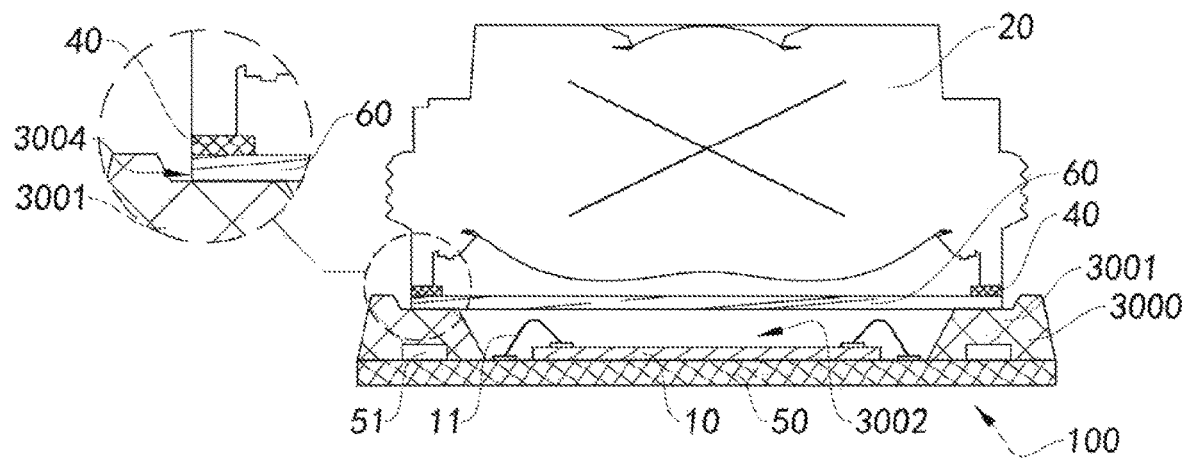
FIG. 14 is a cross-sectional schematic diagram of a second modified embodiment of the fixed-focus photographing module according to the second preferred embodiment of the present disclosure.

FIG. 14 is a second modified embodiment according to the second preferred embodiment of the present disclosure. The integrated base 3000 has the second groove 3004, and the optical filtering element and the optical lens assembly are mounted in the second groove 3004. The optical filtering element 60 is packaged in the second groove 3004 of the integrated base 3000 such that the optical filtering element 60 is further adjacent to the optical lens assembly 20, and the optical filtering element 60 packaged in the integrated base 3000 can be held between the optical lens assembly 20 and the photosensing component 10. That is, the second groove 3004 may be used to mount the optical filtering element 60 and provide an installation space for the glue layer 40.

More specifically, in this embodiment of the present disclosure, the glue layer 40 is disposed between the optical lens assembly and the optical filtering element.

The fixed-focus photographing module of this embodiment of the present disclosure may be formed by: integrally forming the integrated base 3000 on the circuit board 50, and electrically connecting the photosensing component 10 on the circuit board 50, thereby the photosensing assembly 100 is formed; then mounting the optical filtering element 60 in the second groove 3004 of the integrated base 3000, and applying glue at the edge position of the optical filtering element 60 or applying glue at the bottom end of the optical lens assembly 20; then mounting the optical lens assembly 20 to the optical filtering element 60, such that glue is located between the optical filtering element 60 and the optical lens assembly 20, and the optical lens assembly 20 is in the photosensing path of the photosensing component 10; further, adjusting the position of the optical lens assembly 20 relative to the photosensing component 10 to focus the fixed-focus photographing module; further, curing the glue to form the glue layer 40 between the optical lens assembly 20 and the optical filtering element 60.

Figure 15A:
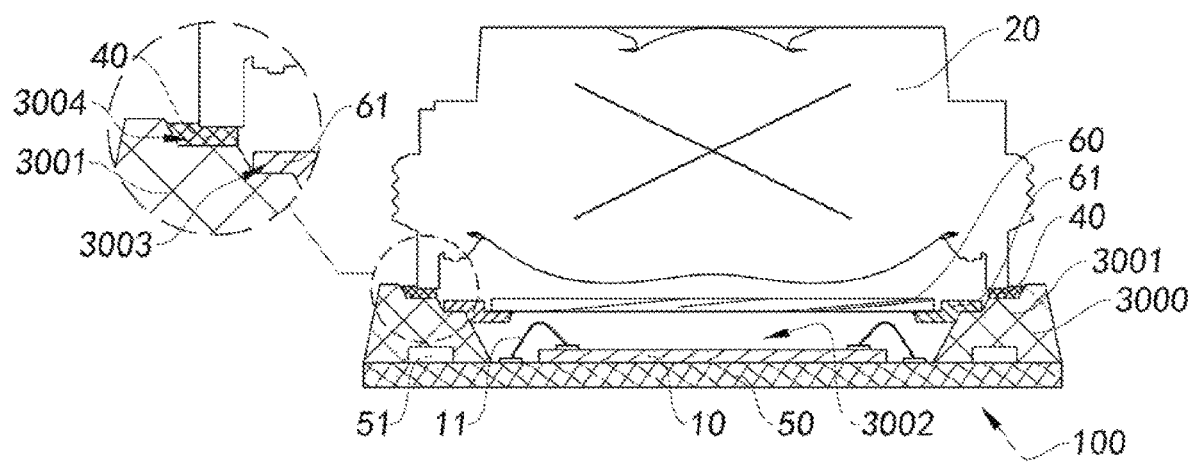
FIG. 15 is a cross-sectional schematic diagram of a fixed-focus photographing module according to a third preferred embodiment of the present disclosure.
FIG. 15B is a cross-sectional schematic diagram of a modified embodiment of the fixed-focus photographing module according to the third preferred embodiment of the present disclosure.

As shown in FIG. 15A, is a schematic diagram of a fixed-focus photographing module according to a third preferred embodiment of the present disclosure. In this embodiment of the present disclosure, the integrated base 3000 has the first groove 3003 and the second groove 3004, and the fixed-focus photographing module includes a support 61, the support 61 is used for mounting the optical filtering element 60, and the support 61 is mounted to the first groove 3003.

The glue layer 40 is disposed between the integrated base 3000 and the optical lens assembly 20. More specifically, the glue layer 40 is disposed on the second groove 3004. That is, the optical lens assembly 20 is mounted to the second groove 3004 through the glue layer 40.

That is, when assembling the fixed-focus photographing module, the optical filtering element 60 may be mounted to the support 61, then the support 61 is mounted to the first groove 3003, and then glue is applied at a predetermined position of the surface of the support 61 or the end of the optical lens assembly 20. The optical lens assembly 20 is further pre-mounted on the integrated base 3000 such that glue is located between the integrated base 3000 and the optical lens assembly 20, and the optical lens assembly 20 is positioned in the photosensing path of the photosensing component 10. Further, the position of the optical lens assembly 20 relative to the photosensing component 10 is adjusted to perform focusing on the fixed-focus photographing module. And further, the glue is cured to form the glue layer 40 between the optical lens assembly 20 and the integrated base 3000.

Figure 15B:
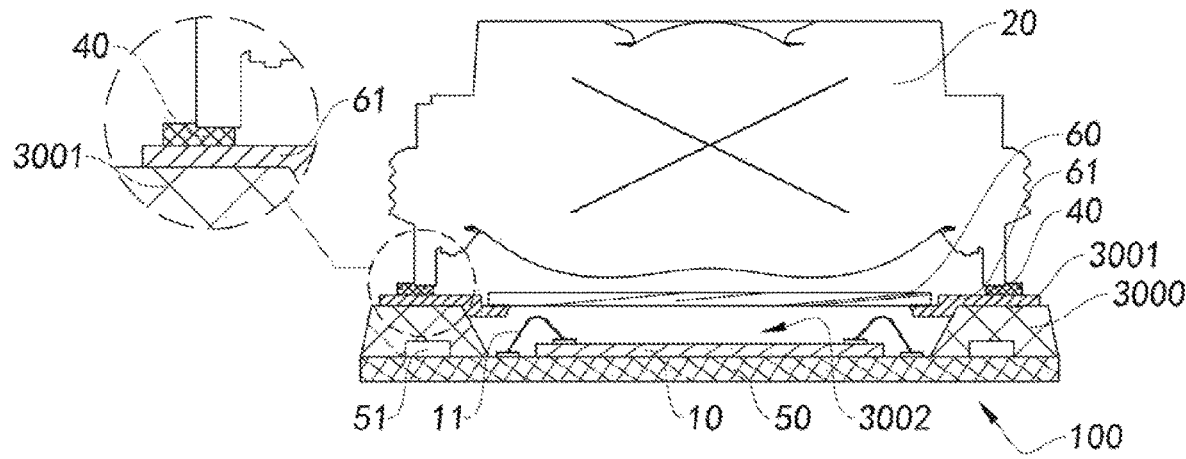

As shown in FIG. 15B, a schematic diagram of a modified embodiment of the fixed-focus photographing module according to the third preferred embodiment of the present disclosure is illustrated. In this embodiment of the present disclosure, the integrated base 3000 has the second groove 3004, and the fixed-focus photographing module includes a support 61, the support 61 is used for mounting the optical filtering element 60, and the support 61 is mounted to the second groove 3004.

More specifically, in this embodiment of the present disclosure, the glue layer 40 is disposed between the support 61 and the optical lens assembly 20.

That is, when assembling the fixed-focus photographing module, the optical filtering element 60 may be mounted to the support 61, then the support 61 is mounted to the second groove 3004, and then glue is applied on a predetermined position of the surface of the support 61 or the end of the optical lens assembly 20. The optical lens assembly 20 is further pre-mounted on the support 61, such that glue is located between the support 61 and the optical lens assembly 20, and the optical lens assembly 20 is positioned in the photosensing path of the photosensing component 10. Further, the position of the optical lens assembly 20 relative to the photosensing component 10 is adjusted to perform focusing on the fixed-focus photographing module. And further, the glue is cured to form the glue layer 40 between the optical lens assembly 20 and the support 61.

Figure 16:
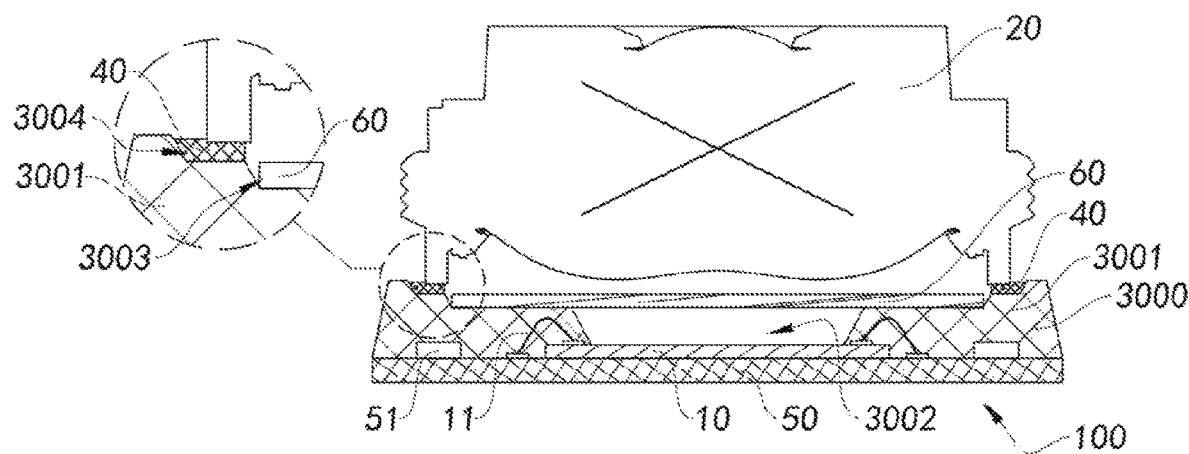
FIG. 16 is a cross-sectional schematic diagram of a fixed-focus photographing module according to a fourth preferred embodiment of the present disclosure.

FIG. 16 is a fixed-focus photographing module according to a fourth preferred embodiment of the present disclosure. In this embodiment of the present disclosure, the integrated base 3000 integrally packages the circuit board and at least a portion of the photosensing component 10. The integrated base 3000 clads the connecting wire 11. That is, in this embodiment of the present disclosure, the integrated base 3000 extends inwardly to the edge of the photosensing component 10. The optical lens assembly 20 is directly disposed on the integrated base 3000.

It is worth mentioning that the photosensing component 10 may be fixed to the circuit board 50 through integrally packaging the circuit board 50 and at least a portion of the photosensing component 10 by the integrated base 3000, so that it may be fixed without separately fixing the photosensing component 10 and the circuit board 50 while expanding the packaging range of the integrated base 3000 inwardly, thereby reducing an outer area of the photosensing assembly 100.

Figure 17:
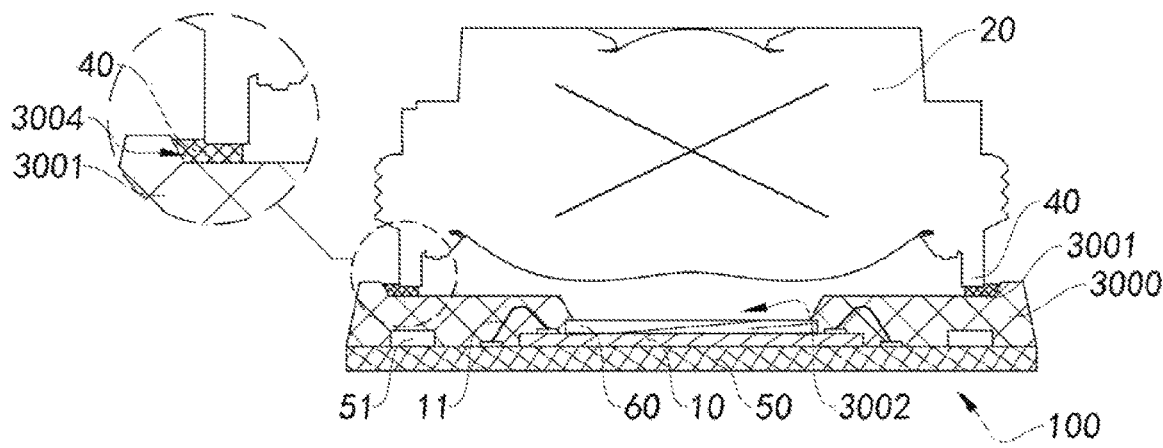
FIG. 17 is a cross-sectional schematic diagram of a modified embodiment of the fixed-focus photographing module according to the fourth preferred embodiment of the present disclosure.
Figure 18:
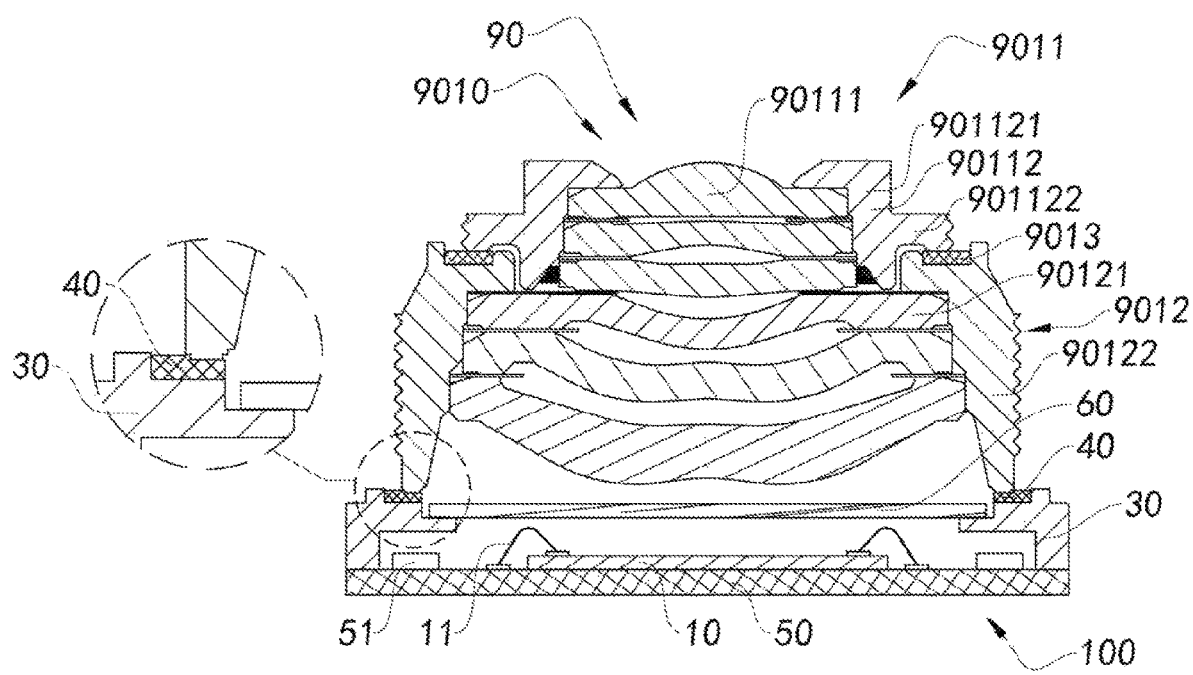
FIG. 18 is a cross-sectional schematic diagram of a fixed-focus photographing module according to a fifth preferred embodiment of the present disclosure.
Figure 19:
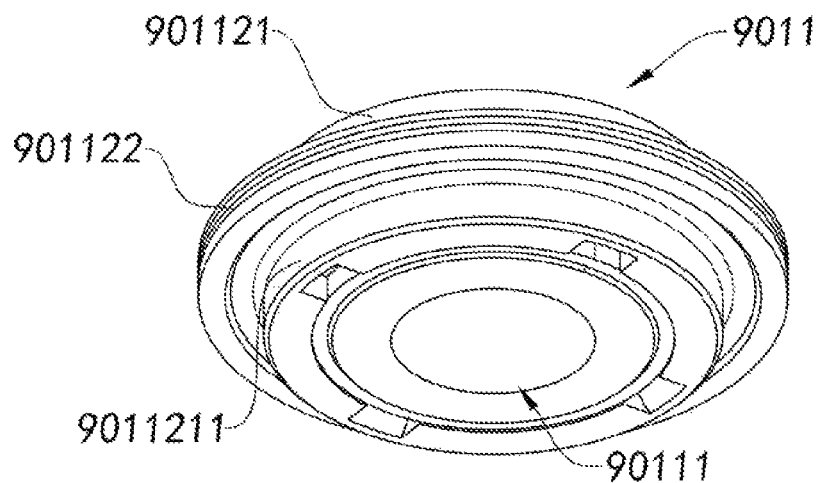
FIG. 19 is a schematic diagram of an upper group unit of a multi-group lens assembly of the fixed-focus photographing module according to the fifth preferred embodiment of the present disclosure.
Figure 20:
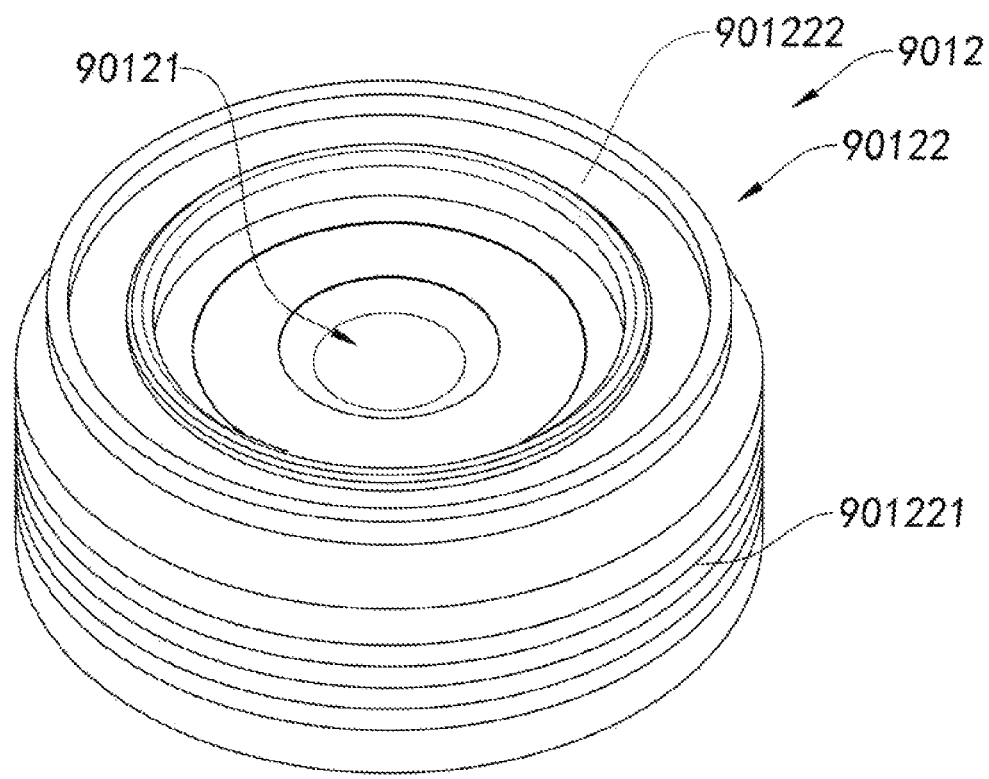
FIG. 20 is a schematic diagram of a lower group unit of the multi-group lens assembly of the fixed-focus photographing module according to the fifth preferred embodiment of the present disclosure.
Figure 21:
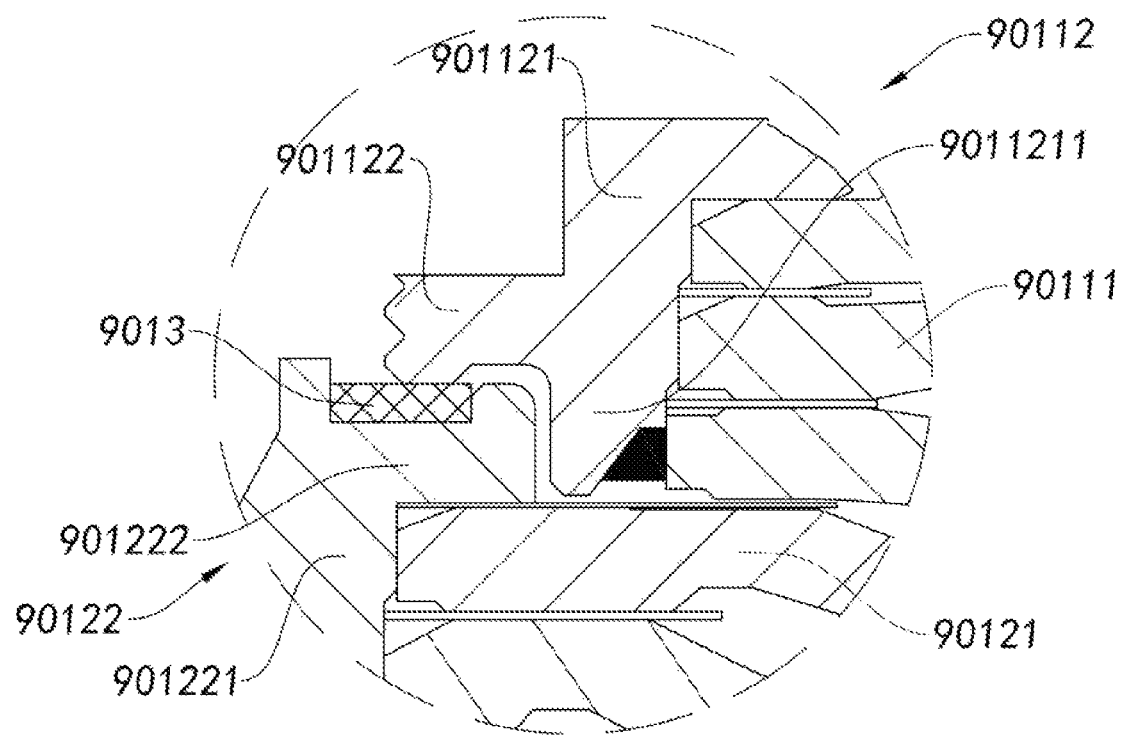
FIG. 21 is a partial enlarged diagram of FIG. 18.

FIG. 17 is a modified embodiment of the fixed-focus photographing module according to the fourth preferred embodiment of the present disclosure. In this embodiment of the present disclosure, the optical filtering element 60 covers the photosensing component 10, the integrated base 3000 integrally packages the circuit board 50, at least a portion of the photosensing component 10, and at least a portion of the optical filtering element 60.

That is, in this embodiment, the integrated base 3000 fixes the photosensing component 10 and the optical filtering element 60, so that a separate fixing method is not required.

Further, the integrated base 3000 has the second groove 3004 for mounting the optical lens assembly 20, that is, in this embodiment of the present disclosure, the integrated base 3000 does not have the first groove 3003 for mounting the optical filtering element 60.

As shown in FIGS. 18-21, a fixed-focus photographing module and a multi-group lens assembly thereof according to a fifth preferred embodiment of the present disclosure is illustrated.

The fixed-focus photographing module includes a multi-group lens assembly 90 that is directly mounted to the lens assembly holder 30. That is, in this embodiment of the present disclosure, the optical lens assembly 20 is the multi-group lens assembly 90.

Further, the multi-group lens assembly 90 is directly mounted to the lens assembly holder 30 through the glue layer 40. The multi-group lens assembly 90 is exposed at the exterior of the lens assembly holder 30.

The multi-group lens assembly 90 includes a plurality of groups 10, and two adjacent group units 10 are assembled in cooperation with each other, and the optical axes of the group units are consistent.

It is worth mentioning that in the conventional fixed-focus photographing module, the lens is usually mounted in the lens barrel, and then the lens is adjusted by adjusting the lens barrel. Similarly, for the multi-group lens assembly composed of a plurality of group units, in the conventional fixed-focus photographing module, a lens barrel or the like is required to be mounted, thus it is not possible to adjust each of the group units 9010 directly, and the lens barrel component is not suitable for being held and adjusted. In the present disclosure, each of the group units 9010 is directly exposed at the exterior of the lens assembly holder 30. Therefore, when assembling the fixed-focus photographing module, each of the group units 9010 may be conveniently adjusted, or the group unit 9010 that needs to be adjusted may be freely selected.

For convenience of description, in this embodiment of the present disclosure, the multi-group lens assembly 90 composed of two of the group units 9010 is taken as an example. In other embodiments of the present disclosure, the multi-group lens assembly 90 may include more of the group units 9010, such as three or more, and the present disclosure is not limited in this regard.

Specifically, the multi-group lens assembly 90 includes two group units 9010, which are an upper group unit 9011 and a lower group unit 9012, respectively. The upper group unit 9011 and the lower group unit 9012 are assembled in cooperation with each other. The upper group unit 9011 and the lower group unit 9012 are stacked, and the optical axis directions of the upper group unit 9011 and the lower group unit 9012 are consistent.

The upper group unit 9011 includes at least one upper lens 90111 and an upper bearing component 90112, and the upper lens 90111 is disposed in the upper bearing component 90112 sequentially along the light path. Preferably, the number of the upper lenses 90111 is plural, such as 2, 3 or more.

The lower group unit 9012 includes at least a lower lens 90121 and a lower bearing component 90122, and the lower lens 90121 is disposed in the lower bearing component 90122 sequentially along the light path. Preferably, the number of the lower lenses 90121 is plural, such as 2, 3 or more.

Further, in this embodiment of the present disclosure, the upper bearing component 90112 of the upper group unit 9011 includes an upper bearing body 901121 and an extension wail 901122. The upper bearing body 901121 is a hollow structure for accommodating, mounting the respective lenses and arranging the respective lenses along a light path. In other words, each of the upper lenses 90111 of the upper group unit 9011 is mounted inside the upper bearing body 901121 to facilitate providing a light passage. The extension wall 901122 extends outward from the outside of the upper bearing body 901121 to facilitate overlapping and joining with the upper bearing component 90112 of the lower group unit 9012.

More specifically, the extension wall 901122 integrally extends outward from the outside of the upper bearing body 901121. In some embodiments, the extension wall 901122 may be an annular extension wall extending outward from the upper bearing body 901121 to form an annular brim structure, so as to overlap and join with the lower bearing component 90122 of the lower group unit 9012 through the annular brim structure, to provide stable support for the upper group unit 9011.

When the upper group unit 9011 and the lower group unit 9012 are fixed, a bonding medium 9013, such as UV glue, thermosetting glue, UV thermosetting glue, or epoxy glue is disposed between the upper group unit 9011 and the lower group unit 9012, in order to stably fix the upper group unit 9011 and the lower group unit 9012. Of course, in other embodiments of the present disclosure, the upper group unit 9011 and the lower group unit 9012 may be fixed by other means, such as heat welding, ultrasonic welding, laser welding, riveting, fastening, and buckling, and the present disclosure is not limited in this regard. The bonding medium 9013 and the glue layer 40 may be formed of the same material and process, or may be formed of different materials and processes. The bonding medium 9013 may be selected from the group consisting of one or more of UV glue, thermosetting glue, UV thermosetting glue, epoxy glue, moisture curing glue, and pressure sensitive adhesive.

According to this embodiment of the present disclosure, the lower group unit 9012 is mounted to the lens assembly holder 30 directly through the glue layer 40.

The upper bearing body 901121 of the upper bearing component 90112 of the upper group unit 9011 has a lower muff-coupling end portion 9011211 located below the extension wall 901122, and the lower muff-coupling end portion 9011211 is sleeved to the lower bearing component 90122 of the lower group unit 9012. In other words, the extension wall 901122 of the upper bearing component 90112 of the upper group unit 9011 divides the upper bearing body 901121 into two parts, the upper part and the lower part, and the lower part is the lower muff-coupling end portion 9011211. When the extension wall 901122 of the upper bearing component 90112 of the upper group unit 9011 is overlapped with the lower bearing component. 90122 of the lower group unit 9012, the lower muff-coupling end portion 9011211 is sleeved to the lower bearing component 90122 of the lower group unit 9012.

The lower bearing component 90122 of the lower group unit 9012 includes a lower bearing body 901221 and an upper overlapping end portion 901222. The lower bearing body 901221 is a hollow structure for accommodating and mounting each of the lower lenses 90121 and arranging them along a light path. In other words, each of the lower lenses 90121 of the lower group unit 9012 is mounted inside the lower bearing body 901221 to facilitate providing a light passage. The upper overlapping end portion 901222 is integrally connected to the lower bearing body 901221 so as to fit the upper bearing component 90112 of the upper group unit 9011, such that when the extension wall 901122 of the upper bearing component overlaps and joins the upper overlapping end portion 901222 of the lower bearing component 90122, the lower muff-coupling end portion 9011211 of the upper bearing component 90112 of the upper group unit 9011 extends into the upper overlapping end portion 901222 of the lower bearing component 90122, thereby the lower bearing component 90122 of the lower group unit 9012 constraining the mounting position of the upper group unit 9011.

In other words, in this embodiment of the present disclosure, the extension wall 901122 and the upper overlapping end portion 901222 form an assembled structure, to facilitate assembling and muff-coupling the upper group unit 9011 and the lower group unit 9012.

The upper overlapping end portion 901222 is a hollow structure extending inwardly to provide an overlapping support position for the upper group unit 9011 and provide a light passage for each of the lower lenses 90121 located in the lower bearing body 901221.

It is worth mentioning that the lens assembly optical axis consistency and assembling time are two important aspects in the actual production and application of the photographing module, and the fixed-focus photographing module formed by the multi-group lens assembly 90 in the present disclosure may be assembled in various ways, and each of the group units 9010 may be conveniently and directly hold to adjust each of the group units 9010, thereby assembling the fixed-focus photographing module accurately, conveniently and quickly.

It is worth mentioning that, in the present disclosure, a plurality of group units 9010 are assembled to form an integral lens assembly, so that the number of lenses in each group unit 9010 is less, and the assembly error of each unit is small, but the multi-group lens assembly 90 composed of the respective group units 9010 has a large number of lenses, so that higher pixels may be provided and the cumulative error is small. In addition, the group units 9010 may be adjusted and assembled by the focusing mechanism in the process of assembling and forming the multi-group lens assembly, so that the relative error between the respective group units 9010 is reduced, and the manufacturing error of the lens assembly itself may be compensated by adjustment, so that the multi-group lens assembly 90 has better optical consistency. Each of the group units 9010 is assembled to each other in cooperation through an assembling structure, so that the group units 9010 are stably assembled to form the multi-group lens assembly 90, and the cooperation may block external stray light from entering the interior of the multi-group lens assembly 90, to avoid interference with the optical system of the multi-group lens assembly 90. And in some embodiments, the group units 9010 may be fixed by a rapidly forming bonding medium 9013, such as UV thermosetting glue. The cooperation structure may provide sufficient ultraviolet light irradiation area for the bonding medium, so that the group units may be assembled and fixed quickly and stably, thereby improving production efficiency.

The multi-group lens assembly 90 may be assembled in the lens assembly holder 30 in a plurality of methods to form the fixed-focus photographing module.

For example, in one method, the lower group unit 9012 may first be pre-assembled to the lens assembly holder 30, then the lower group unit 9012 is directly adjusted by the focusing mechanism 80, and then the lower group unit 9012 is fixed to the lens assembly holder 30 through the glue layer 40; then the upper group unit 9011 is pre-assembled to the lower group unit 9012, the upper group unit 9011 is directly adjusted by the focusing mechanism 80, and then the upper group unit 9011 is fixed to the lower group unit 9012 through the bonding medium 9013; and the foregoing method is performed until all of the group units 9010 are fixed. It is worth mentioning that, in this adjustment method, the group units 9010 may be adjusted by an auxiliary lens assembly in cooperation. For example, when the lower group unit 9012 is adjusted, the auxiliary lens assembly is disposed above the lower group unit 9012 to observe imaging information of the fixed-focus photographing module, and the lower group unit 9012 is adjusted according to the imaging information. In this way, the assembly of each of the group units 9010 may be accurately adjusted, and errors caused by factors such as deformation of the photosensing component 10 or the circuit board 50 may be compensated by successive adjustments, thereby improving the imaging quality of the fixed-focus photographing module.

Figure 22:
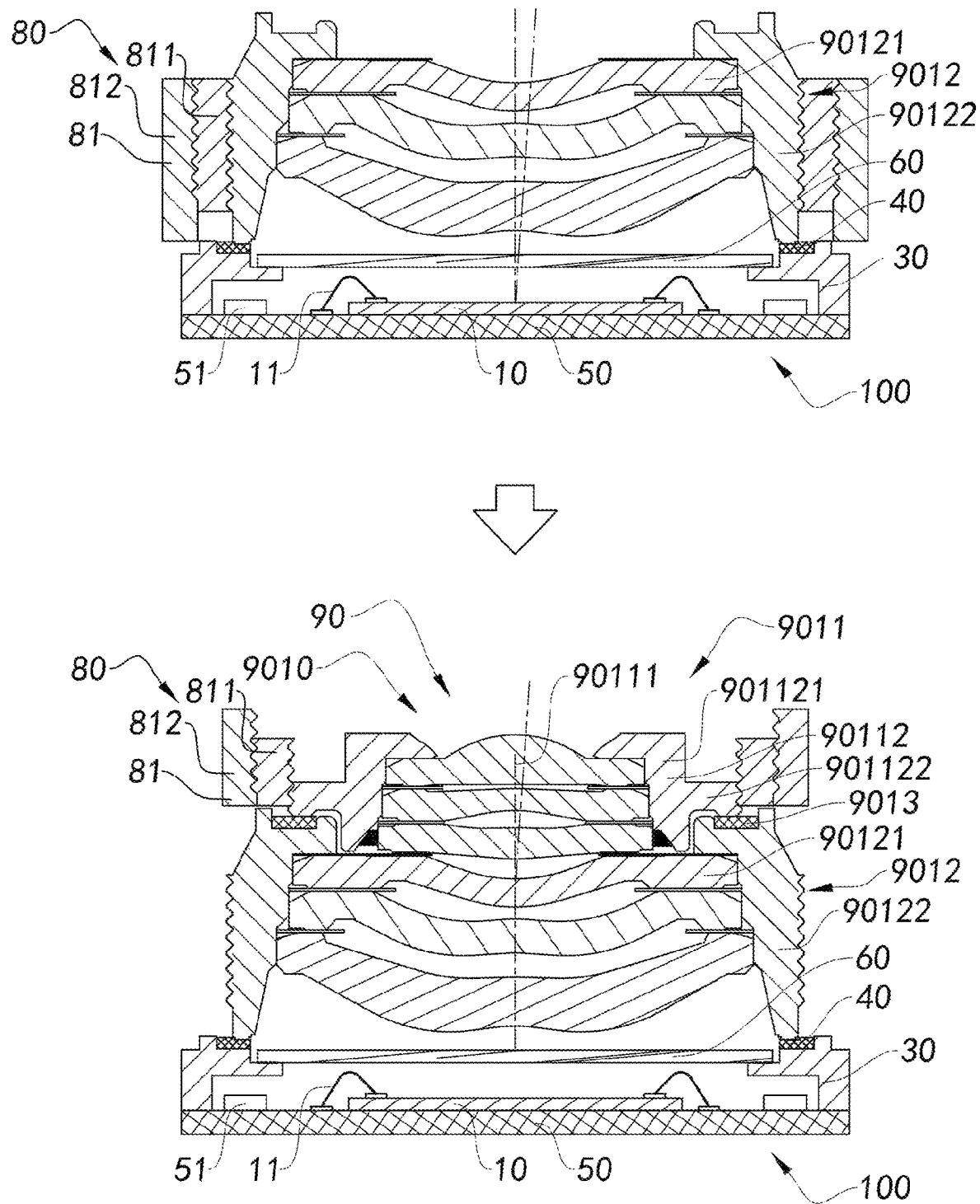
FIG. 22 is a schematic diagram of an assembly process of the fixed-focus photographing module according to the fifth embodiment of the present disclosure.

More specifically, referring to FIG. 22, the inner sleeve 811 of the lens assembly holding apparatus 81 of the focusing mechanism 80 detachably holds the lower group unit 9012, and the outer bracket 812 adjusts the inner sleeve 811 to adjust the lower group unit 9012; further, after the adjustment of the lower group unit 9012 reaches a predetermined requirement, the lower group unit 9012 and the lens assembly holder 30 are held by the glue layer 40; further, the inner sleeve 811 is disengaged from the lower group unit 9012 by adjusting the outer bracket 812; further, the upper group unit 9011 is pre-assembled to the lower group unit 9012; further, the inner sleeve 811 of the lens assembly holding apparatus 81 of the focusing mechanism 80 detachably holds the upper group unit 9011, and the inner sleeve 811 is adjusted by the outer bracket 812, thereby adjusting the upper group unit 9011; further, the upper group unit 9011 and the lower group unit 9012 are fixed by the bonding medium 9013; and further, the inner sleeve 811 is disengaged from the upper group unit 9011 by adjusting the outer bracket 812, thereby obtaining the fixed-focus photographing module.

For example, in another method, the upper group unit 9011 and the lower group unit 9012 may be pre-assembled simultaneously in the photosensing path of the photosensing component 10; then the focusing mechanism 80 directly adjusts the lower group unit 9012 and/or the upper group unit 9011, causing the pre-assembled fixed-focus photographing module meeting predetermined imaging requirements; and the lower group unit 9012 is further fixed to the lens assembly holder 30 by the glue layer 10, and the upper group unit 9011 is fixed to the lower group unit 9012 by the bonding medium 9013. Of course, the group units 9010 may be assembled into a full-featured lens assembly, that is, the multi-group lens assembly 90 is assembled and obtained first, and then is assembled in the lens assembly holder 30 as a whole.

Figure 23:
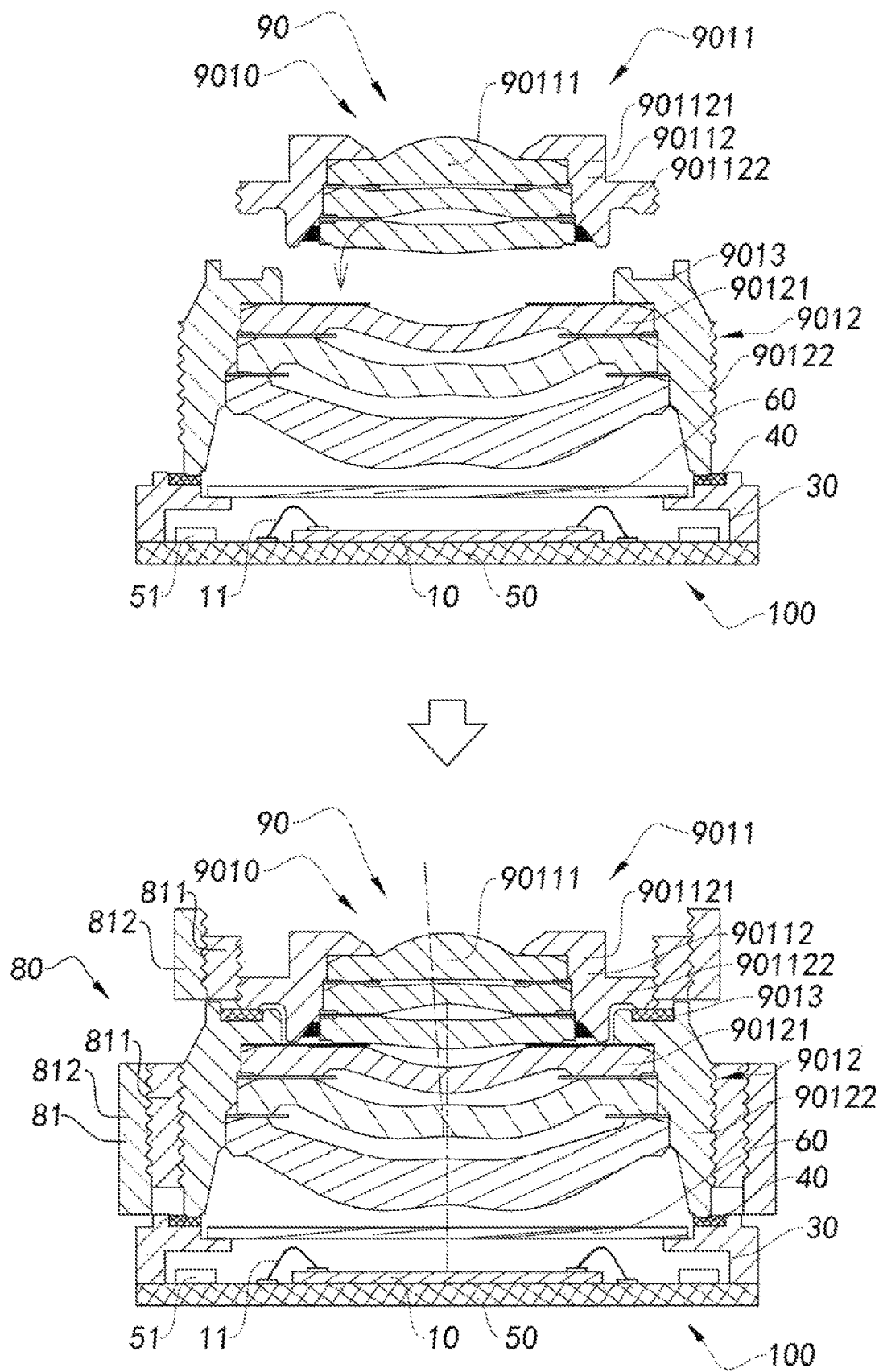
FIG. 23 is a schematic diagram of another assembly process of the fixed-focus photographing module according to the fifth embodiment of the present disclosure.

More specifically, referring to FIG. 23, the upper group unit 9011 and the lower group unit 9012 are pre-assembled to the lens assembly holder 30; further, the inner sleeve 811 of the lens assembly holding apparatus 81 of the focusing mechanism 80 detachably holds the lower group unit 9012, and the outer bracket 812 adjusts the inner sleeve 811 to adjust the lower group unit 9012; further, after the adjustment of the lower group unit 9012 reaches a predetermined requirement, the lower group unit 9012 and the lens assembly holder 30 are fixed by the glue layer 40; further, the inner sleeve 811 is disengaged from the lower group unit 9012 by adjusting the outer bracket 812; further, the inner sleeve 811 of the lens assembly holding apparatus 81 of the focusing mechanism 80 detachably holds the upper group unit 9011, and the inner sleeve 811 is adjusted by the outer bracket 812, thereby adjusting the upper group unit 9012; further, the upper group unit 9011 and the lower group unit 9012 are fixed by the bonding medium 9013; and further, the inner sleeve 811 is disengaged from the upper group unit 9011 by adjusting the outer bracket 812, thereby obtaining the fixed-focus photographing module.

It is worth mentioning that the lens assembly holding apparatus 81 may holds the group units 9010 from the side or may hold from the top of the group units 9010.

Figure 24:
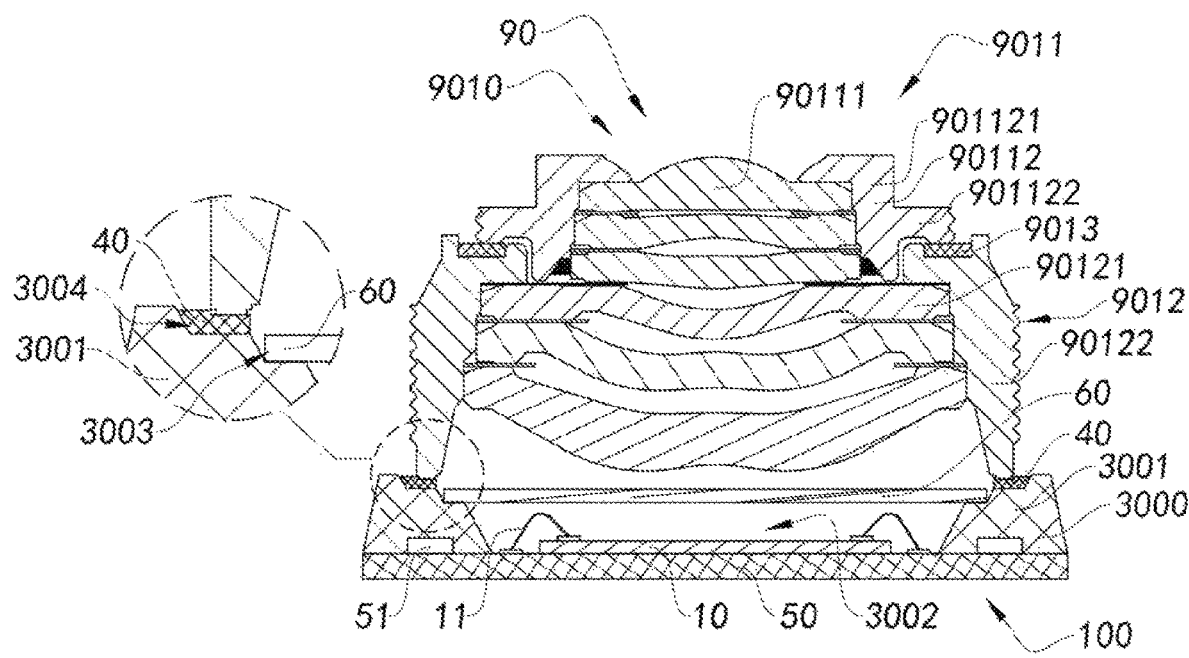
FIG. 24 is a cross-sectional schematic diagram of a fixed-focus photographing module according to a sixth preferred embodiment of the present disclosure.

As shown in FIG. 24, is a cross-sectional schematic diagram of a fixed-focus photographing module according to a sixth preferred embodiment of the present disclosure. Different from the above embodiments, the multi-group lens assembly 90 is directly mounted to the integrated base 3000. More specifically, the multi-group lens assembly 90 is directly fixed to the integrated base 3000 by the glue layer 40. That is, the glue layer 40 is disposed between the multi-group lens assembly 90 and the integrated base 3000.

When manufacturing the fixed-focus photographing module, after the photosensing assembly with the integrated base 3000 is formed by integral molding, the multi-group lens assembly 90 or one of the group units 9010 is directly mounted to the integrated base 3000 as a whole, such that the multi-group lens assembly 90 is directly mounted without providing a separate barrel component.

It is worth mentioning that, in this embodiment of the present disclosure, the integrated base 3000 is formed by integral molding, and has a flat surface, which may directly provide a flatter mounting plane for the multi-group lens assembly 90. It is beneficial to improve the imaging quality of the fixed-focus photographing module.

It is worth mentioning that the fixed-focus photographing module described in the embodiments shown in FIGS. 12-24 may be adjusted by the focusing mechanism 80 shown in FIGS. 6-10, and then fixed to obtain the fixed-focus photographing module.

The multi-group lens assembly 90 may be assembled in the integrated base 3000 in a plurality of methods to form the fixed-focus photographing module of the molding type.

For example, in one method, the lower group unit 9012 may first be pre-assembled to the integrated base 3000, then the lower group unit 9012 is directly adjusted by the focusing mechanism 80, and then the lower group unit 9012 is fixed to the integrated base 3000 through the glue layer 40; then the upper group unit 9011 is pre-assembled to the lower group unit 9012, the upper group unit 9011 is directly adjusted by the focusing mechanism 80, and then the upper group unit 9011 is fixed to the lower group unit 9012 through the bonding medium 9013; and the foregoing method is performed until all of the group units 9010 are fixed. It is worth mentioning that, in this adjustment method, the group units 9010 may be adjusted by an auxiliary lens assembly in cooperation. For example, when the lower group unit 9012 is adjusted, the auxiliary lens assembly is disposed above the lower group unit 9012 to observe imaging information of the fixed-focus photographing module, and the lower group unit 9012 is adjusted based on the imaging information. In this way, the assembly of each of the group units 9010 may be accurately adjusted, and errors caused by factors such as deformation of the photosensing component 10 or the circuit board 50 may be compensated by successive adjustments, thereby improving the imaging quality of the fixed-focus photographing module.

More specifically, the inner sleeve 811 of the lens assembly holding apparatus 81 of the focusing mechanism 80 detachably holds the lower group unit 9012, and the outer bracket 812 adjusts the inner sleeve 811 to adjust the lower group unit 9012; further, after the adjustment of the lower group unit 9012 reaches a predetermined requirement, the lower group unit 9012 and the integrated base 3000 are fixed by the glue layer 40; further, the inner sleeve 811 is disengaged from the lower group unit 9012 by adjusting the outer bracket 812; further, the upper group unit 9011 is pre-assembled to the lower group unit 9012; further, the inner sleeve 811 of the lens assembly holding apparatus 81 of the focusing mechanism 80 detachably holds the upper group unit 9011, and the inner sleeve 811 is adjusted by the outer bracket 812, thereby adjusting the upper group unit 9011; further, the upper group unit 9011 and the lower group unit 9012 are fixed by the bonding medium 9013; and further, the inner sleeve 811 is disengaged from the upper group unit 9011 by adjusting the outer bracket 812, thereby obtaining the fixed-focus photographing module.

For example, in another method, the upper group unit 9011 and the lower group unit 9012 may be pre-assembled simultaneously in the photosensing path of the photosensing component 10; then the focusing mechanism 80 directly adjusts the lower group unit 9012 and/or the upper group unit 9011, causing the pre-assembled fixed-focus photographing module meeting predetermined imaging requirements; and the lower group unit 9012 is further fixed to the integrated base 3000 by the glue layer 40, and the upper group unit 9011 is fixed to the lower group unit 9012 by the bonding medium 9013. More specifically, the upper group unit 9011 and the lower group unit 9012 are pre-assembled to the integrated base 3000. Further, the inner sleeve 811 of the lens assembly holding apparatus 81 of the focusing mechanism 80 detachably fixes the lower group unit 9012, and the outer bracket 812 adjusts the inner sleeve 811 to adjust the lower group unit 9012; further, after the adjustment of the lower group unit 9012 reaches a predetermined requirement, the lower group unit 9012 and the integrated base 3000 are fixed by the glue layer 40; further, the inner sleeve 811 is disengaged from the lower group unit 9012 by adjusting the outer bracket 812; further, the inner sleeve 811 of the lens assembly holding apparatus 81 of the focusing mechanism 80 detachably fixes the upper group unit 9011, and the inner sleeve 811 is adjusted by the outer bracket 812, thereby adjusting the upper group unit 9012; further, the upper group unit 9011 and the lower group unit 9012 are fixed by the bonding medium 9013; and further, the inner sleeve 811 is disengaged from the upper group unit 9011 by adjusting the outer bracket 812, thereby obtaining the fixed-focus photographing module.

For example, in another method, a plurality of the upper group units 9011 and the lower group units 9012 may be assembled into a complete multi-group lens assembly, and the multi-group lens assembly is fixed to the lower group unit 9012 by the bonding medium 9013. Then the multi-group lens assembly 90 is directly adjusted by the focusing mechanism 80, causing the pre-assembled fixed-focus photographing module meeting predetermined imaging requirements. Further, the multi-group lens assembly is fixed to the integrated base 3000 by the glue layer 40.

Figure 25:
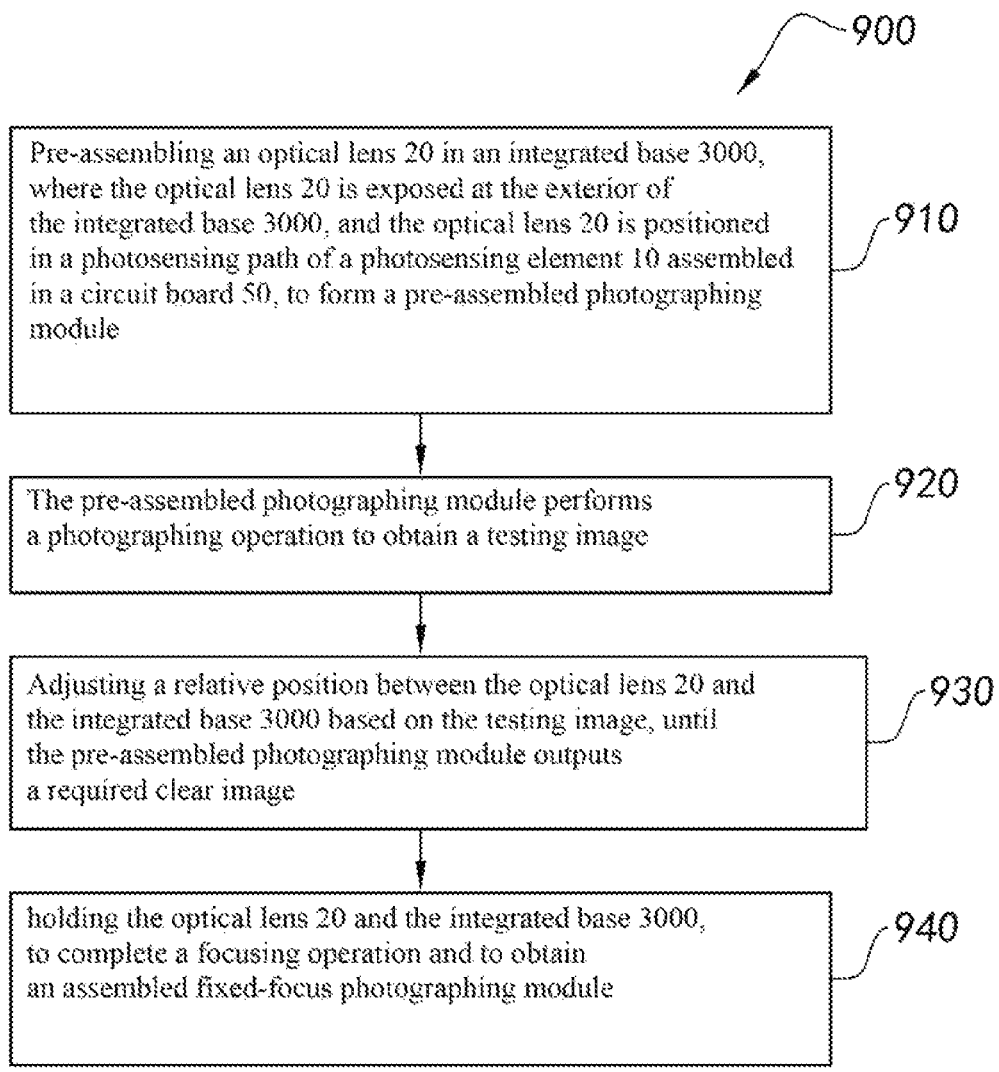
FIG. 25 is a flowchart schematic diagram of another focusing process of the fixed-focus photographing module according to the above embodiments of the present disclosure.

Correspondingly, referring to FIG. 25, the present disclosure provides a method 900 for focusing a fixed-focus photographing module, which includes the following steps:

Step 910 of pre-assembling the optical lens assembly: pre-assembling an optical lens assembly 20 in an integrated base 3000, where the optical lens assembly 20 is exposed at the exterior of the integrated base 3000, and the optical lens assembly 20 is positioned in a photosensing path of a photosensing component 10 assembled on a circuit board 50 to form a pre-assembled photographing module;

Step 920 of obtaining a testing image: the pre-assembled photographing module performing a photographing operation to obtain a testing image;

Step 930 of focusing: adjusting a relative position between the optical lens assembly 20 and the integrated base 3000 based on the testing image, until the pre-assembled photographing module outputs a required clear image; and Step 940 of completing module assembly: fixing the optical lens assembly 20 and the integrated base 3000 to complete a focusing operation and to obtain an assembled fixed-focus photographing module that is.

Figure 26:
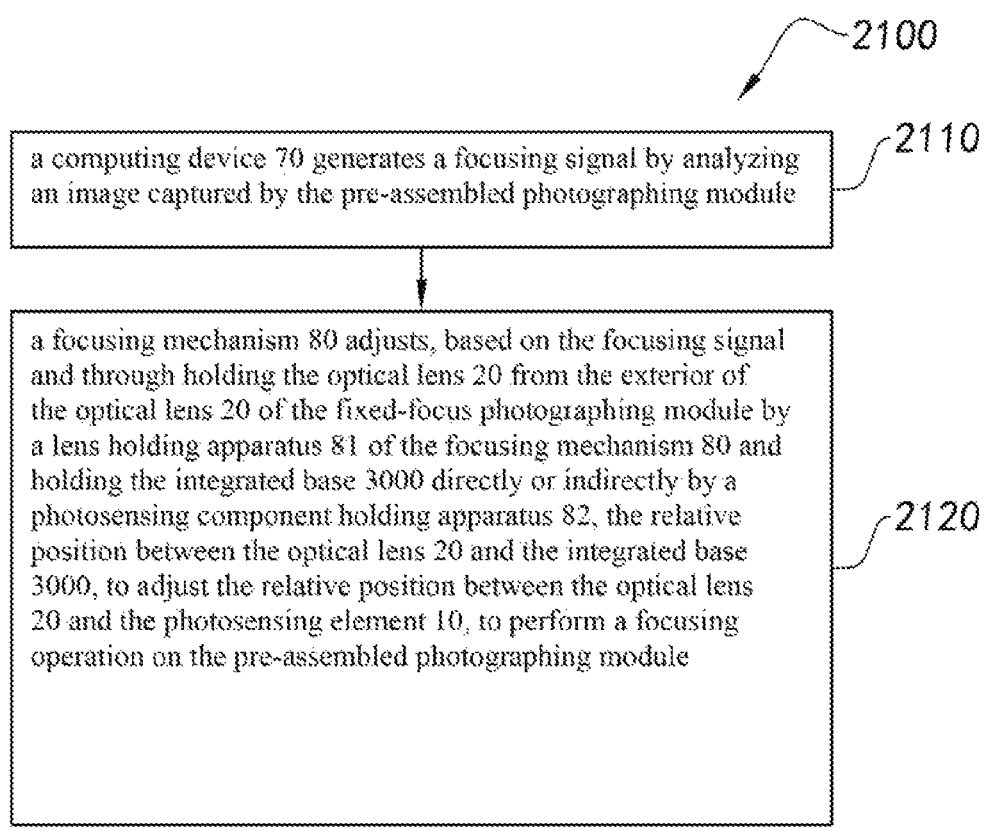
FIG. 26 is a block schematic diagram of another process of adjusting position of the optical lens assembly of the fixed-focus photographing module according to the above embodiments of the present disclosure.

Referring to FIG. 26, the present disclosure further provides a method 2100 for adjusting the relative position of the optical lens assembly 20 and the photosensing component 10 of a fixed-focus photographing module, where the focusing method. 2100 includes the following steps:

Step 2110, (I) a computing device 70 generates a focusing signal by analyzing an image captured by the pre-assembled photographing module; and Step 2120, (II) a focusing mechanism 80 adjusts, based on the focusing signal and through holding the optical lens assembly 20 from the exterior of the optical lens assembly 20 of the fixed-focus photographing module by a lens assembly holding apparatus 81 of the focusing mechanism 80 and holding the integrated base 3000 directly or indirectly by a photosensing component holding apparatus 82, the relative position between the optical lens assembly 20 and the integrated base 3000, to adjust the relative position between the optical lens assembly 20 and the photosensing element 10, to perform a focusing operation on the pre-assembled photographing module. Further, before the step (I), the method further includes the steps of:

holding the optical lens assembly 20 in a photosensing path of the photosensing component 10; and photographing a test form located in an optical path of the optical lens assembly 20 after the photosensing component 10 is powered, to obtain an image associated with the test form.

Further, in the step (I), the method further includes the steps of:

a receiving module 71 receives the image captured by the fixed-focus photographing module;

an analyzing module 72 analyzes the image; and a data generating module 73 generates the focusing signal based on an analysis result of the analyzing module 72, for the focusing mechanism 80 performing the focusing operation on the fixed-focus photographing module based on the focusing signal.

Further, in the above method, the photosensing component 10 is mounted to a circuit board 50 packaged on an integrated base 3000, and the photosensing assembly holding apparatus 82 holds the integrated base 3000 or holds the circuit board 50 such that the position of the photosensing component 10 is fixed.

Those skilled in the art should understand that the embodiments of the present disclosure described in the above description and the accompanying drawings are merely examples and do not limit the present disclosure.

The objective of the present disclosure has been achieved completely and efficiently. The function and structural principles of the present disclosure have been illustrated and described in the embodiments, and the embodiments of the present disclosure may be transformed or modified without departing from the principles of the present disclosure.

What is claimed is:

1. A method for focusing a fixed-focus photographing module, the method comprising:
   (A) pre-assembling an optical lens assembly in a lens assembly holder, wherein the optical lens assembly is exposed at an exterior of the lens assembly holder, and the optical lens assembly is located in a photosensing path of a photosensing component assembled in a circuit board to form a pre-assembled photographing module;
   (B) performing, by the pre-assembled photographing module, a photographing operation to obtain a testing image;
   (C) adjusting, according to the testing image, a relative position between the optical lens assembly and the lens assembly holder until the pre-assembled photographing module outputs a clear image as required; and
   (D) fixing the optical lens assembly and the lens assembly holder to complete a focusing operation and obtain an assembled fixed-focus photographing module,
   wherein the method comprises: dispensing glue between the optical lens assembly and the lens assembly holder, and curing the glue after positions of the optical lens assembly and the lens assembly holder are determined, to form a sealed glue layer between the optical lens assembly and the lens assembly holder; and
   wherein the optical lens assembly is mounted on an outer side of a top end of the lens assembly holder; and
   wherein the top end of the lens assembly holder has an outer groove, and the glue layer directly packages the optical lens assembly in the outer groove of the lens assembly holder.

2. The method for focusing a fixed-focus photographing module according to claim 1, wherein the step (A) further comprises:
   applying the glue on the lens assembly holder by dispensing; and
   mounting a lower surface of the optical lens assembly to the lens assembly holder, such that the glue forms the glue layer between the optical lens assembly and the lens assembly holder.

3. The method for focusing a fixed-focus photographing module according to claim 1, wherein in the step (C), the position of the lens assembly holder is fixed, and the relative position between the optical lens assembly and the lens assembly holder is adjusted by adjusting the optical lens assembly, thereby adjusting a relative position between the optical lens assembly and the photosensing component.

4. The method for focusing a fixed-focus photographing module according to claim 1, wherein in the step (C), the position of the optical lens assembly is fixed, and the relative position between the optical lens assembly and the lens assembly holder is adjusted by adjusting the position of the lens assembly holder, thereby adjusting a relative position between the optical lens assembly and the photosensing component.

5. The method for focusing a fixed-focus photographing module according to claim 3, wherein a lens assembly holding apparatus drives the optical lens assembly to move, wherein the lens assembly holding apparatus holds the optical lens assembly at an exterior of the optical lens assembly and is located on a top of the lens assembly holder.

6. The method for focusing a fixed-focus photographing module according to claim 5, wherein the lens assembly holding apparatus is engaged with an outer peripheral surface of the optical lens assembly to hold the optical lens assembly.

7. The method for focusing a fixed-focus photographing module according to claim 5, wherein the lens assembly holding apparatus holding the optical lens assembly from a top of the optical lens assembly.

8. The method for focusing a fixed-focus photographing module according to claim 5, wherein a mode for holding the lens assembly holding apparatus and the optical lens assembly is selected from: screw thread, limit, buckle, UV dissociation glue, hot melt and vacuum adsorption.

9. The method for focusing a fixed-focus photographing module according to claim 1, wherein an optical filtering element is mounted on an inner side of the top end of the lens assembly holder.

10. The method for focusing a fixed-focus photographing module according to claim 9, wherein the top end of the lens assembly holder further has an inner groove, and the optical filtering element is packaged in the inner groove of the lens assembly holder.

11. The method for focusing a fixed-focus photographing module according to claim 1, further comprising: generating, by a computing device, a focusing signal by analyzing an image captured by the pre-assembled photographing module; and based on the focusing signal, adjusting a relative position between the optical lens assembly and a photosensing chip by adjusting, by a lens assembly holding apparatus of a focusing mechanism, the position of the optical lens assembly, to perform a focusing operation on the fixed-focus photographing module.

12. The method for focusing a fixed-focus photographing module according to claim 1, wherein the optical lens assembly comprises at least two group units, the respective group units are assembled in cooperation with each other, and optical axes of the group units are consistent.

13. The method for focusing a fixed-focus photographing module according to claim 12, wherein each of the group units comprises at least one bearing component and at least one lens, and the lens is mounted on the bearing component.

14. The method for focusing a fixed-focus photographing module according to claim 13, wherein the at least two group units are an upper group unit and a lower group unit, and the upper group unit is muff-coupled to the lower group unit.

15. The method for focusing a fixed-focus photographing module according to claim 14, wherein the upper group unit comprises an upper bearing body and an extension wall, the lower group unit comprises a lower bearing body, the extension wall extends outward from an outside of the upper bearing body, and overlaps the lower bearing body of the lower group unit.

16. The method for focusing a fixed-focus photographing module according to claim 15, wherein the extension wall forms an annular brim structure.

17. The method for focusing a fixed-focus photographing module according to claim 15, wherein the upper bearing body has a lower muff-coupling end portion under the extension wall, and the lower muff-coupling end portion is muff-coupled to the lower bearing body.

18. The method for focusing a fixed-focus photographing module according to claim 15, wherein the upper bearing body and the lower bearing body are hollow structures, and a plurality of the lenses are respectively mounted in the upper bearing body and the lower bearing body.

19. A focusing apparatus, configured to perform a focusing operation on a pre-assembled photographing module, the pre-assembled photographing module comprising a circuit board, a photosensing component assembled in the circuit board, a lens assembly holder disposed on the circuit board and an optical lens assembly pre-assembled to the lens assembly holder, the optical lens assembly being exposed at an exterior of the lens assembly holder, and the optical lens assembly being positioned in a photosensing path of the photosensing component,
wherein the optical lens assembly is mounted on an outer side of a top end of the lens assembly holder, and wherein the top end of the lens assembly holder has an outer groove, and a glue layer formed between the optical lens assembly and the lens assembly holder directly packages the optical lens assembly in the outer groove of the lens assembly holder,
wherein the focusing apparatus comprising:
a computing device, connected to the pre-assembled photographing module to acquire an image captured by the pre-assembled photographing module; and
a focusing mechanism, the focusing mechanism comprising a lens assembly holding apparatus and a photosensing assembly holding apparatus, the lens assembly holding apparatus holding, at a top side of the lens assembly holder of the pre-assembled photographing module, the optical lens assembly, the photosensing assembly holding apparatus being configured to directly or indirectly hold the lens assembly holder, the computing device adjusting a relative position between the optical lens assembly and the lens assembly holder by analyzing the image captured by the pre-assembled photographing module, to adjust a relative position between the optical lens assembly and a photosensing chip, so that the pre-assembled photographing module outputting a required clear image to complete the focusing operation.

* * * * *

UNITED STATES PATENT AND TRADEMARK OFFICE
CERTIFICATE OF CORRECTION

PATENT NO. : 10,897,611 B2  
APPLICATION NO. : 16/311896  
DATED : January 19, 2021  
INVENTOR(S) : Zhenyu Chen et al.

It is certified that error appears in the above-identified patent and that said Letters Patent is hereby corrected as shown below:

On the Title Page

In item (30) Foreign Application Priority Data, priority documents listed only include
CN 2016 2 0638177 U and should be corrected to include:
CN 201620638177.9 with priority date 6-23-2016,
CN 201610487305.9 with priority date 6-23-2016,
CN 201620650844.5 with priority date 6-23-2016, and
CN 201610480992.1 with priority date 6-23-2016.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*